US012654713B1

(12) United States Patent　　　(10) Patent No.:　US 12,654,713 B1
Pertsel et al.　　　　　　　　　　(45) Date of Patent:　　Jun. 16, 2026

(54) DRIVER MONITORING WITH REAL TIME FEEDBACK

(71) Applicant: Ambarella International LP, Santa Clara, CA (US)

(72) Inventors: Shimon Pertsel, Mountain View, CA (US); Udit Budhia, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 266 days.

(21) Appl. No.: 18/621,504

(22) Filed: Mar. 29, 2024

(51) Int. Cl.
　*B60W 40/09*　　(2012.01)
　*B60W 50/14*　　(2020.01)
　*G06F 40/205*　　(2020.01)
　*G06V 10/75*　　(2022.01)
　*G06V 20/59*　　(2022.01)
　*B60W 40/08*　　(2012.01)

(52) U.S. Cl.
　CPC ............ *B60W 40/09* (2013.01); *B60W 50/14* (2013.01); *G06F 40/205* (2020.01); *G06V 10/751* (2022.01); *G06V 20/597* (2022.01); *B60W 2040/0827* (2013.01); *B60W 2420/403* (2013.01); *B60W 2540/229* (2020.02); *B60W 2556/35* (2020.02); *B60W 2556/45* (2020.02)

(58) Field of Classification Search
None
See application file for complete search history.

(56) References Cited

U.S. PATENT DOCUMENTS

| 9,714,037 | B2 * | 7/2017 | DeRuyck | ............. | G06V 20/597 |
| 11,117,584 | B2 * | 9/2021 | D'Sa | ................. | B60W 30/0956 |
| 11,947,933 | B2 * | 4/2024 | Todirel | ............... | G06F 11/1471 |
| 12,269,485 | B2 * | 4/2025 | Fields | ............... | B60W 50/0098 |
| 12,351,195 | B1 * | 7/2025 | Lundsgaard | .......... | B60W 10/20 |
| 12,450,924 | B2 * | 10/2025 | Khilariwal | ........... | G06V 20/597 |
| 12,505,568 | B1 * | 12/2025 | Broggi | ................... | G06T 7/593 |
| 2017/0274907 | A1 * | 9/2017 | Palmer | ................. | B60W 40/08 |
| 2022/0126864 | A1 * | 4/2022 | Moustafa | .......... | B60W 60/0013 |
| 2023/0286516 | A1 * | 9/2023 | Fields | .................... | G06Q 40/08 |
| 2024/0116515 | A1 * | 4/2024 | Herrou | ................. | G07C 5/0808 |
| 2024/0208522 | A1 * | 6/2024 | Verma | .................. | B60W 40/09 |
| 2024/0289859 | A1 * | 8/2024 | Batie | ................. | G06Q 30/0631 |
| 2025/0022291 | A1 * | 1/2025 | Khilariwal | .............. | B60Q 9/00 |
| 2025/0111252 | A1 * | 4/2025 | Isaac | ..................... | B60W 40/09 |
| 2025/0201146 | A1 * | 6/2025 | Goren | ................. | G08G 1/0962 |

* cited by examiner

*Primary Examiner* — Anand P Bhatnagar
(74) *Attorney, Agent, or Firm* — Maiorana Patent Law, PA

(57)　　　　　　ABSTRACT

An apparatus comprising an interface and a processor. The interface may be configured to receive pixel data of a driver of a vehicle and an environment near the vehicle. The processor may be configured to process the pixel data arranged as video frames, generate a text description of the video frames, store the text description and a timestamp as metadata with the video frames, store triggers, compare the triggers to the text description, and generate a driver score in response to the comparison. A first AI model may perform video to text analysis to generate the text description. A second AI model may be configured to perform the comparison and generate the driver score in response to the triggers. The plurality of triggers may comprise a plain text description of driver behavior and an operation of the vehicle in the environment.

20 Claims, 15 Drawing Sheets

<u>FIG. 7</u>

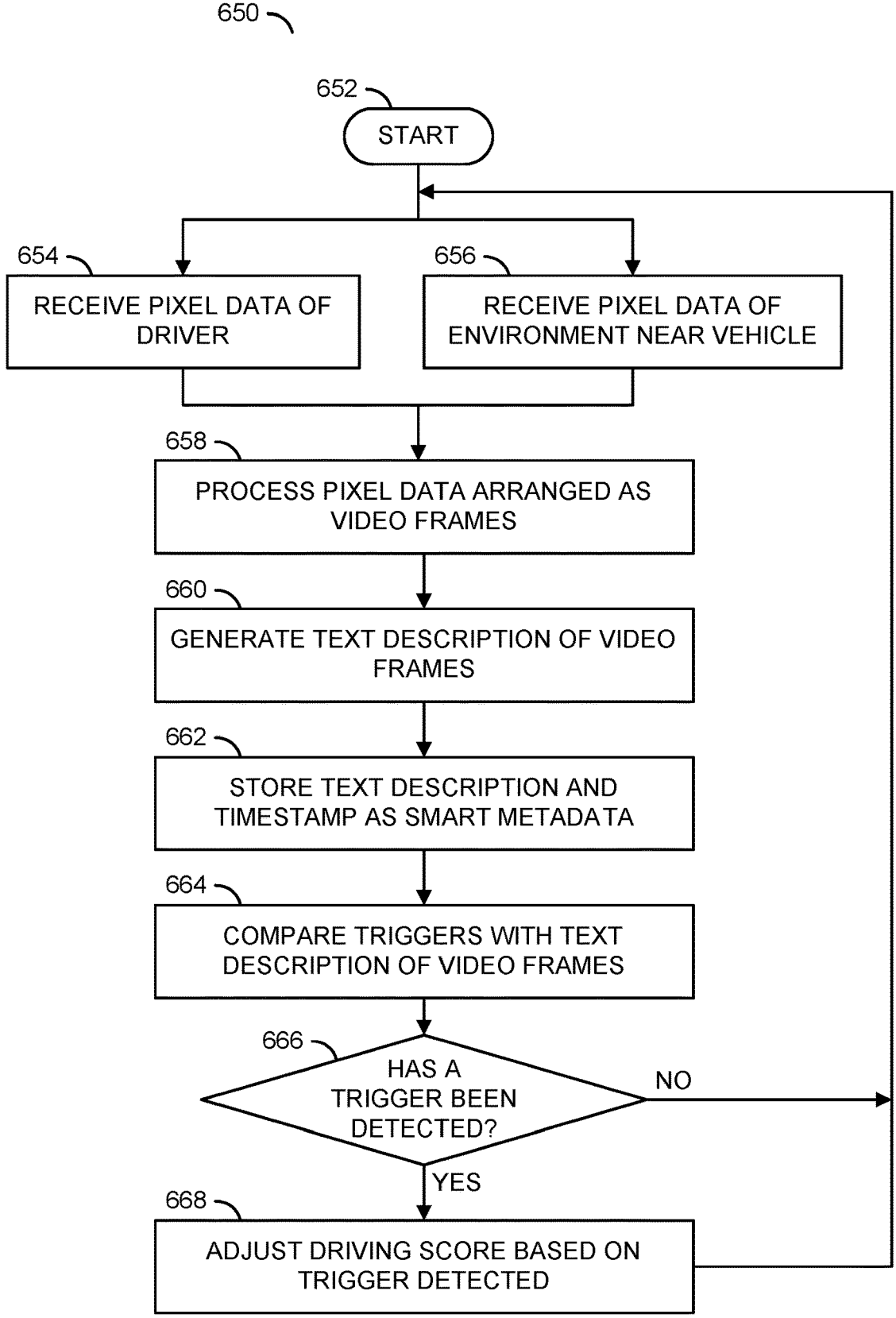

650

652
START

654
RECEIVE PIXEL DATA OF DRIVER

656
RECEIVE PIXEL DATA OF ENVIRONMENT NEAR VEHICLE

658
PROCESS PIXEL DATA ARRANGED AS VIDEO FRAMES

660
GENERATE TEXT DESCRIPTION OF VIDEO FRAMES

662
STORE TEXT DESCRIPTION AND TIMESTAMP AS SMART METADATA

664
COMPARE TRIGGERS WITH TEXT DESCRIPTION OF VIDEO FRAMES

666
HAS A TRIGGER BEEN DETECTED?
NO
YES

668
ADJUST DRIVING SCORE BASED ON TRIGGER DETECTED

FIG. 12

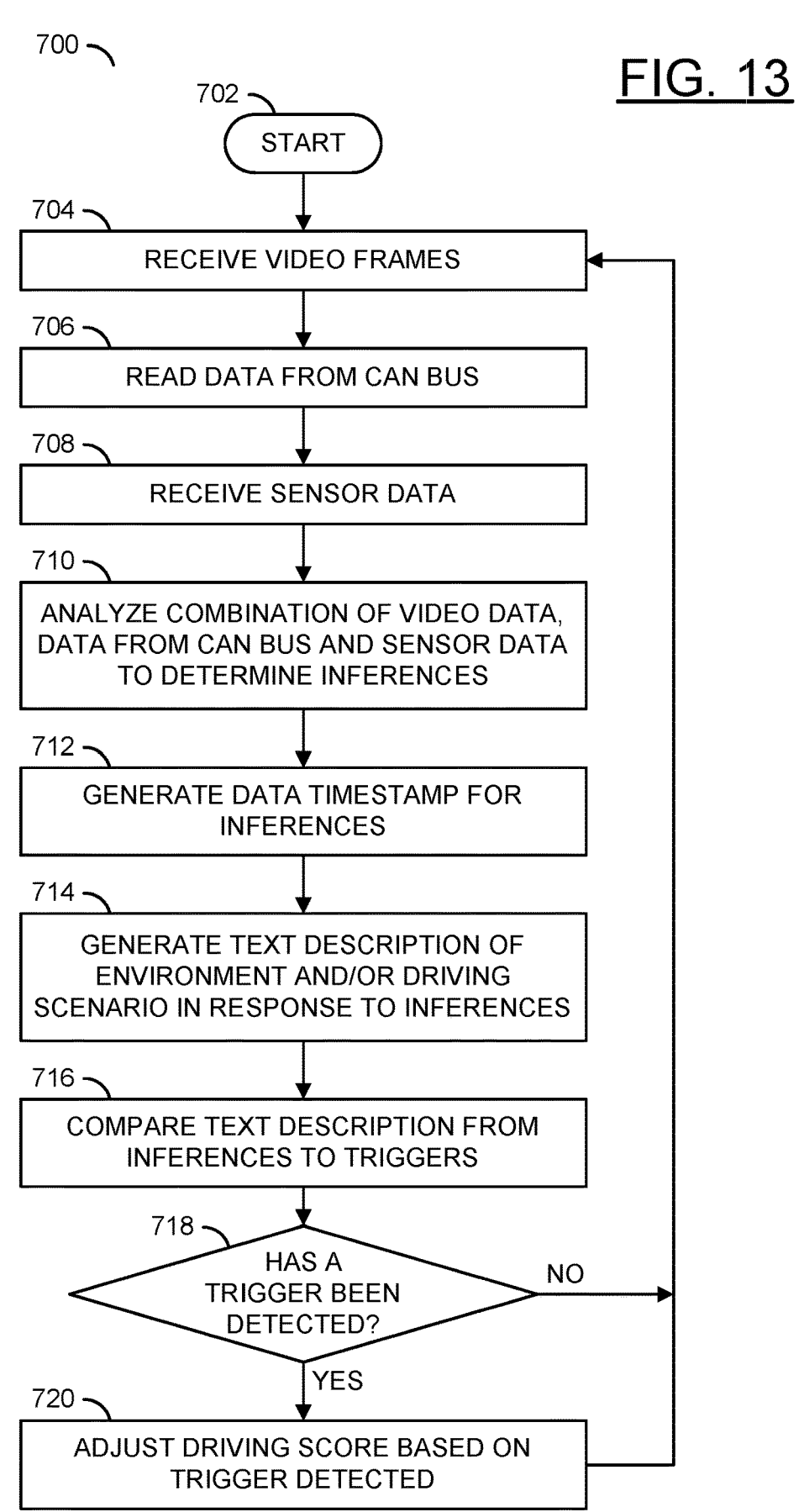

START

704

RECEIVE VIDEO FRAMES

706

READ DATA FROM CAN BUS

708

RECEIVE SENSOR DATA

710

ANALYZE COMBINATION OF VIDEO DATA, DATA FROM CAN BUS AND SENSOR DATA TO DETERMINE INFERENCES

712

GENERATE DATA TIMESTAMP FOR INFERENCES

714

GENERATE TEXT DESCRIPTION OF ENVIRONMENT AND/OR DRIVING SCENARIO IN RESPONSE TO INFERENCES

716

COMPARE TEXT DESCRIPTION FROM INFERENCES TO TRIGGERS

718

HAS A TRIGGER BEEN DETECTED?

NO

YES

720

ADJUST DRIVING SCORE BASED ON TRIGGER DETECTED

DRIVER MONITORING WITH REAL TIME FEEDBACK

FIELD OF THE INVENTION

The invention relates to vehicle monitoring generally and, more particularly, to a method and/or apparatus for implementing driver monitoring with real time feedback.

BACKGROUND

Vehicles are increasingly being equipped with safety features. Sensors provide data for various warnings from seat belt warnings to lane change warnings. Video cameras used for backup cameras are now a standard feature on new vehicles. Drivers and other occupants in a vehicle receive numerous audio dings, beeps and chimes to warn about potential safety issues.

While safety feedback can provide immediate warnings, they do not necessarily improve driver behavior. In some cases, drivers can become reliant on technology to warn about safety issues and become less vigilant with driver safety. For example, so-called fully autonomous driving has led to drivers performing dangerous activities while driving. Drivers should be encouraged to improve their driving skills. There are also skills and driving behaviors that a driver can be encouraged to learn that go beyond safety. For example, accelerating and decelerating smoothly can improve fuel efficiency and cause less wear on brakes. In some scenarios a parent or an owner of a fleet of vehicles will want information about how a driver is driving, treating the vehicle or treating the cargo in the vehicle. In-vehicle notifications do not provide information for others to review.

It would be desirable to implement driver monitoring with real time feedback.

SUMMARY

The invention concerns an apparatus comprising an interface and a processor. The interface may be configured to receive pixel data of a driver of a vehicle and an environment near the vehicle. The processor may be configured to process the pixel data arranged as video frames, generate a text description of the video frames, store the text description and a timestamp corresponding to the text description as metadata with the video frames, store a plurality of triggers, perform a comparison of the triggers to the text description of the video frames, and generate a driver score in response to the comparison of the triggers to the text description. A first AI model may be configured to perform video to text analysis of the video frames to generate the text description of the driver and the objects in the environment. A second AI model may be configured to perform the comparison and generate the driver score in response to the triggers. The plurality of triggers may comprise a plain text description of driver behavior and an operation of the vehicle in the environment.

BRIEF DESCRIPTION OF THE FIGURES

Embodiments of the invention will be apparent from the following detailed description and the appended claims and drawings.

FIG. 12 is a flow diagram illustrating a method for implementing driver monitoring with real-time feedback.

FIG. 13 is a flow diagram illustrating a method for adjusting a driver score based on inferences from sensor fusion.

DETAILED DESCRIPTION OF THE EMBODIMENTS

Figure 1:
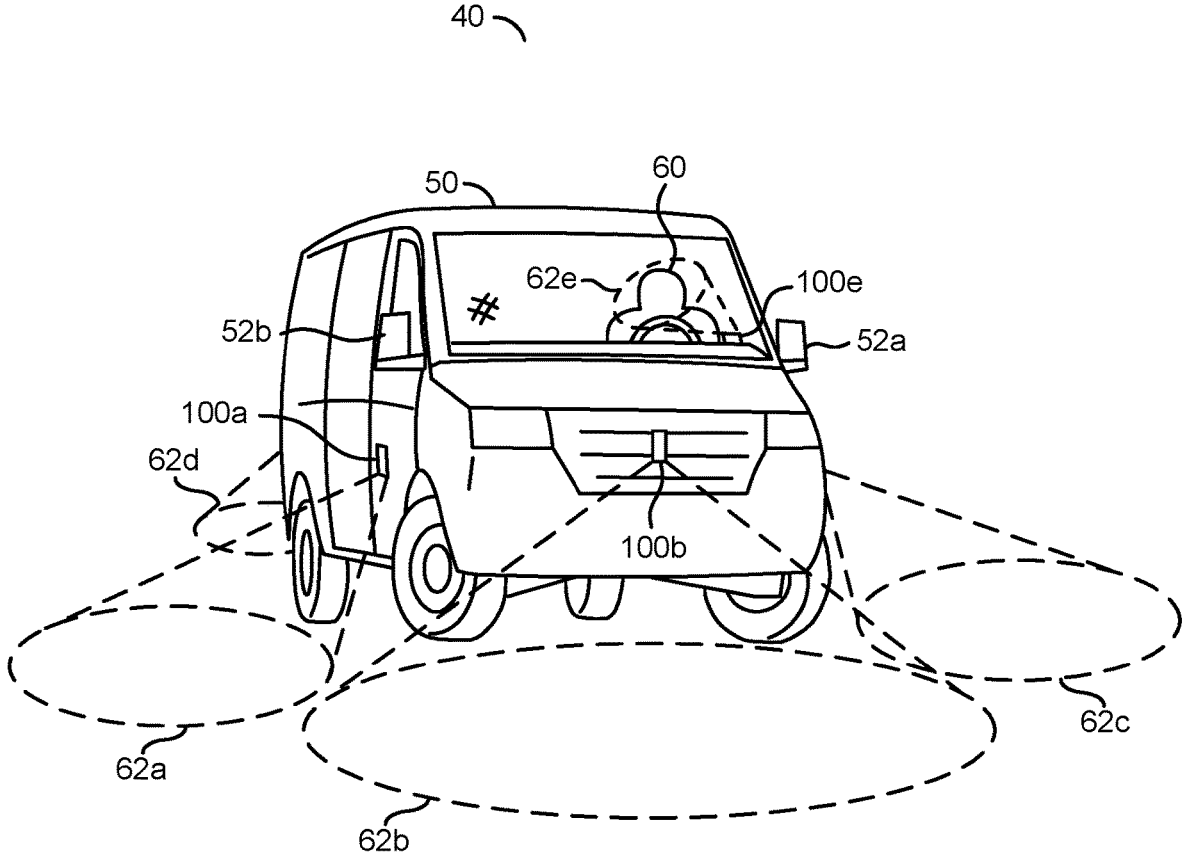
FIG. 1 is a diagram illustrating an example embodiment of the present invention configured to provide an all-around view of a vehicle.

Embodiments of the present invention include providing driver monitoring with real time feedback that may (i) implement video-to-text analysis, (ii) analyze video and smart metadata for pre-defined triggers, (iii) provide a natural language video search, (iv) implement one or more AI models locally on an edge device, (v) upload video data to cloud services and access results from AI models implemented in the cloud services, (vi) generate smart metadata that provides a full description of driver behavior and the environment near a vehicle, (vii) describe a combination of video and other sensor data, (viii) provide driving information about a fleet of vehicles and/or (ix) be implemented as one or more integrated circuits.

Embodiments of the present invention may be configured to provide notifications, generate a driving score, generate text descriptions of the environment near the vehicle and/or behavior of a driver and/or enable a search of the video generated using a natural language search. The video data that may be searched and/or analyzed may be generated by vehicle cameras integrated into the vehicle (e.g., a backup camera) and/or after market cameras installed on a vehicle (e.g., a dashcam, a security camera, a truck bed monitoring camera, a cargo hold camera, etc.). The video data analyzed may be generated while the vehicle is idle (e.g., parked) and/or in motion (e.g., while driving). The type of camera implemented to monitor an environment near the vehicle and/or the driver of a vehicle may be varied according to the design criteria of a particular implementation.

Embodiments of the present invention may be configured to process pixel data arranged as video frames and perform computer vision operations on the video frames. Smart metadata may be generated in response to objects in the environment detected using the computer vision operations. Using the smart metadata, driver behavior may be determined. The driver behavior may comprise the direct actions of the driver and/or how the driver is controlling the vehicle. The driver behavior may be stored in response to generating a text description of each of the objects detected in the environment and/or the context of the data captured. The driver behavior may also be determined from sensors on the vehicle other than video sensors (e.g., lidar, radar, thermal imaging, data provided over the CAN bus, etc.). The smart metadata may be generated using image to text artificial intelligence (AI) models. In some embodiments, the image to text AI models may be implemented on an edge device (e.g., implemented by a processor of the vehicle camera). In some embodiments, the image to text AI models may be implemented by cloud computing services (e.g., video data may be uploaded to a computing service that may offer computational services based on demand and/or usage to generate the smart metadata and the smart metadata may be communicated back to the edge device). The implementation of the one or more AI models implemented may be varied according to the design criteria of a particular implementation.

In some embodiments, the video frames generated may be continuously and/or continually analyzed using a video to text AI model. In some embodiments, the analysis of the video to text AI model may be limited to video frames that correspond to an event being detected (e.g., detecting motion, detecting audio, detecting a particular type of object, detecting a person, etc.). In some embodiments, the video to text AI model may be configured to perform the text generation in real time (e.g., at the same rate as the frame rate of the video capture device). The video to text AI model may be configured to generate natural language text based on patterns and/or relationships between words in a particular language (e.g., a spoken language). In one example, the AI model may implement a Large Language Model (LLM). The video to text AI model may be configured to generate a text description of the objects in the image and/or several key images from the video. The text description may be stored as metadata alongside the video data at a corresponding time code (e.g., timestamp).

The text description may comprise more than keywords. In an example, the text description may comprise a plain language description of the contents of each video frame. The text description may provide a thorough explanation of objects, features and/or context of the contents of the captured video. In one example, a keyword description may provide basic elements of the video (e.g., a person, dog, street, darkness, etc.) while the text description may comprise context (e.g., a person walking their dog outside on a city street at night time, etc.). In another example, the text description may comprise details about a type of behavior and/or location that the behavior occurred (e.g., the driver followed a vehicle too closely at GPS location X,Y, the driver was distracted by a smartphone at 10:15 pm, the driver appeared drowsy after driving for 6 hours, etc.). The text description may be human readable text and/or generated to fully describe the image as if written by a human. The type of description and/or the level of detail used for the text description generated by the video to text AI model may be varied according to the design criteria of a particular implementation.

Embodiments of the present invention may be configured to detect pre-defined triggers. The triggers may indicate a particular type of driver behavior and/or driving scenario. The triggers may be used to generate a driving score (e.g., an overall rating of the driver) and/or provide suggestions for driver improvement. For example, the driver behavior may be determined in response to comparing the behavior of the driver in the video data captured (e.g., based on an analysis of the smart metadata) to a number of the triggers. Each trigger may have a corresponding driver score (e.g., a positive score for good driving behavior and/or a deduction for poor driving behavior). In some embodiments, a particular trigger may be added to the list of triggers by a user providing user input that describes the criteria for a trigger. The criteria for the trigger may be a plain language description. In one example, the criteria may be "notify me when a driver is distracted while passing another vehicle". In yet another example, the criteria may be "detect when the driver is stopping too quickly". In another example, the criteria may be "notify the driver when the driver is displaying signs of drowsiness". The type of criteria for a trigger may be varied according to the design criteria of a particular implementation.

Embodiments of the present invention may be configured to perform computer vision on the video frames to determine whether the trigger for one or more of the driving behaviors have been met. The triggers may be implemented in order to determine types of driving behavior of a driver (e.g., both good behavior and poor behavior) in response to detecting particular types of events (e.g., motion, audio, objects detected, facial recognition, the movement of the vehicle, etc.). The analysis for the triggers may be configured to classify an importance and/or urgency of the content of the video data based on the driving score for the trigger. In one example, detecting a driver driving too fast may be an event that has been detected, but may not be an event that a user wants to be notified about immediately each time it happens. In another example, a driver falling asleep may be an event that should result in an immediate notification to the driver. In yet another example, a driver singing in the car may be an event but may not be a trigger resulting in a change of driver score. Events may be detected using object/behavior recognition and may be noted and/or flagged, but may not necessarily be criteria for generating notifications and/or adjusting the driver score.

An AI model may be configured to determine the triggers and/or compare the triggers with results of the computer vision operations. In one example, a driving score AI model may be a neural network (NN). For example, the driving score AI model may be a convolutional neural network. The driving score AI model may be trained to determine whether various events detected are one of the triggers. In one example, the user may provide a human, plain language description of the trigger. In some embodiments, the driving score AI model may suggest triggers for a particular driver and/or fleet manager in response to being trained in response to learning particular descriptions, events and/or keywords that particular users tend to request notifications for (e.g., interact with, engage with, request, etc.). For example, a driver that travels over the speed limit occasionally may not be considered an important event. However, if a user repeatedly sets notification rules for checking the speed of the vehicle, then the driving score AI model may be trained to suggest a trigger for speeding. In some embodiments, the training of the driving score AI model may be personalized and/or individualized. For example, an AI model trained for one user (e.g., a parent) may learn that detection of circumstances related to safety and location, while an AI model trained for another user (e.g., a fleet manager) may learn that detection location may not be considered urgent (e.g., long-haul truckers may frequently take detours). The AI model may be trained for multiple different users, each having a distinct profile. The AI model may be trained for different types of objects. The particular events that may be learned by the driving score AI model may be varied according to the design criteria of a particular implementation.

Embodiments of the present invention may be configured to enable a driving score query interface. The driving score query interface may provide a user with information about each trigger detected, an overall score determined for a particular driver and/or recommendations for improved driving behavior. In some embodiments, the driving score may be determined for a single driver and/or multiple drivers of a single vehicle. In some embodiments, the driving score may be determined for each vehicle of a fleet of vehicles and/or each driver that uses a vehicle in a vehicle fleet. The driving score query interface may comprise a natural language input that may be analyzed and/or interpreted (e.g., using a large language model AI) to compare with the driving score data to determine a response to a query.

Embodiments of the present invention may be configured to enable a trigger interface. The trigger interface may enable a user to set the criteria for generating notification and/or updating a driving score and/or provide an explanation about why the particular driving behavior may be important (e.g., decelerating slowly reduces brake wear). The natural language interface may enable a user to provide criteria for the trigger using plain language. The natural language interface may be configured to process the triggers to determine which behaviors affect the driving score and/or how to interpret the criteria when analyzing the video frames. The natural language interface may be configured to provide triggers based customizable criteria provided.

The natural language interface may be implemented using an AI model. The driving score AI model may be configured to parse the user input and/or compare the context and/or topic of the trigger with the text description of the smart metadata and/or the text description of the events detected. The driving score AI model may be configured to perform natural language processing and/or determine a behavior associated with the trigger based on the patterns and/or relationships between the words of the trigger. In one example, the driving score AI model may be an LLM (e.g., Gemini, ChatGPT, Claude, etc.). The natural language interface may enable the user to provide an input (e.g., "let me know when one of my drivers is sleepy", "deduct points from the driver score if tailgating is detected", "monitor the temperature in the cargo hold", etc.). In an example, the driving score AI model may be configured to determine the particular trigger (e.g., 'driver' refers to a person, 'sleepy' refers to a group of driver behaviors, 'tailgating' refers to a relationship between two vehicles, etc.).

In some embodiments, a notification may be generated in response to the computer vision operations. In some embodiments, an update to a driving score and/or a record of events for a driver may be performed. In some embodiments, the notification may comprise suggestions to the driver for driving improvement and/or justifications for the recommended improvement (e.g., slow down to improve fuel efficiency). Smart metadata may be generated in response to analyzing the video frames. The smart metadata may describe the contents of the video frames. The smart metadata may be compared to the criteria for the triggers.

Notifications and/or driving score updates may be generated when the criteria for the trigger is met. Sending a notification depending on the particular type of trigger may ensure desired notifications are received and/or limit false positives. The response to a query may comprise the natural language text description of the video frames. The natural language text description in the response may enable the user to quickly read about the contents of the video. Reading the contents of the video may enable bandwidth savings (e.g., the user may understand what happens in the video without downloading the video frames). Reading the contents of the video may enable the user to determine whether to understand the video faster through reading rather than taking the time to watch the video frames. The user may later decide to watch the video (e.g., when more privacy is available, when the user has more time, if the user decides that the video is worth watching, etc.).

Referring to FIG. 1, a diagram illustrating an example embodiment of the present invention configured to provide an all-around view of a vehicle is shown. An external view 40 for a vehicle 50 is shown. In the example shown, the vehicle 50 may be a utility van. For example, the vehicle 50 may be a commercial vehicle (e.g., package delivery, a service van, a public transport van, etc.). In some embodiments, the vehicle 50 may be a commercial truck (e.g., a semi-trailer truck). In some embodiments, the vehicle 50 may be a pickup truck (e.g., a light duty vehicle, a medium duty vehicle, a heavy duty vehicle, etc.). In some embodiments, the vehicle 50 may be a commuter and/or home use vehicle (e.g., a family vehicle such as a sedan, a minivan, a SUV, a crossover, etc.). The vehicle 50 may be an internal combustion engine (ICE) vehicle, a diesel vehicle, a hybrid electric vehicle, a battery electric vehicle, etc. The type of the vehicle 50 implemented may be varied according to the design criteria of a particular implementation.

External side view mirrors 52a-52b are shown on the vehicle 50. The side view mirror 52a may be a side view mirror on the driver side of the vehicle 50. The side view mirror 52b may be a side view mirror on the passenger side of the vehicle 50. A driver 60 is shown in the interior of the vehicle 50. The vehicle 50 may comprise devices 100a-100n. The devices 100a-100n may be camera systems. Camera systems 100a-100b are shown integrated as part of the vehicle 50. The camera system 100a is shown on a passenger side of the vehicle 50. The camera system 100a is shown below the passenger side view mirror 52b. The camera system 100b is shown on the front grille of the vehicle 50. In the perspective of the vehicle 50 shown, three of the camera systems 100a-100b and 100e may be visible. However, one of the camera systems 100a-100n may be implemented at a level below the driver side view mirror 52a (not visible from the perspective of the external view 40 shown). Other camera systems 100a-100n may be located throughout the exterior and/or interior of the vehicle 50. The camera systems 100a-100n may be configured to capture an all-around view of the environment 40 near the vehicle 50.

Dashed lines 62a-62e are shown. In the example shown, the dashed lines 62a are shown extending from the camera system 100a and the dashed lines 62b are shown extending from the camera system 100b towards the exterior of the vehicle. The dashed lines 62c-62d may similarly extend from respective camera systems 100c-100d (not visible from the perspective shown). The dashed lines 62a-62d may provide an illustrative representation of fields of view captured by each of the camera systems 100a-100d. The fields of view 62a-62d together may provide an all-around view of the environment near the vehicle 50.

The all-around view 62a-62d is shown. In an example, the all-around view 62a-62d may enable an all-around view (AVM) system. The AVM system may comprise four cameras (e.g., each camera may comprise a combination of one of the camera systems 100a-100n and/or a stereo pair of the lenses implemented by the camera systems 100a-100n). In the perspective shown in the external view 40, the camera system 100a and the camera system 100b may each be one of the four cameras and the other two cameras may not be visible. In an example, the camera system 100b may be a camera located on the front grille of the vehicle 50, one of the cameras may be on the rear (e.g., over the license plate), the camera system 100a may be located below the side view mirror 52b on the passenger side and one of the cameras may be located below the side view mirror 52a on the driver side. The arrangement of the cameras may be varied according to the design criteria of a particular implementation.

The dashed lines 62e are shown are shown extending from the camera system 100e towards an interior of the vehicle 50. The camera system 100e may be a cabin monitoring camera system. The camera system 100e may be configured to capture the field of view 62e of the cabin of the vehicle 50. The field of view 62e may be directed towards the driver 60. In some embodiments, the field of view 62e may be directed towards the driver 60 and/or other occupants of the vehicle 50. In some embodiments, more than one of the camera systems 100a-100n may be directed towards the interior of the vehicle 50. For example, one or more of the camera systems 100a-100n may be implemented in a cargo area of the vehicle 50 (e.g., with one of the field of views 62a-62n configured to monitor cargo and/or items carried by the vehicle 50). Details of cargo monitoring may be described in association with U.S. application Ser. No. 18/583,298, filed on Feb. 21, 2024, appropriate portions of which are incorporated by reference. The camera systems 100a-100n may be configured to capture the all-around view of the vehicle 50 and/or the interior of the vehicle 50. The particular location of the camera systems 100a-100n and/or the field of views 62a-62e may be varied according to design criteria of a particular implementation.

In some embodiments, each of the camera systems 100a-100e may be configured to capture pixel data arranged as video frames. In some embodiments, each of the camera systems 100a-100d providing the all-around view 62a-62d and/or the camera system 100e providing the cabin view may implement a fisheye lens (e.g., may capture a video frame with a 180 degree angular aperture). The all-around view 62a-62d is shown providing a field of view coverage all around the vehicle 50. For example, the portion of the all-around view 62a may provide coverage for a passenger side of the vehicle 50, the portion of the all-around view 62b may provide coverage for a front of the vehicle 50, the portion of the all-around view 62c may provide coverage for a driver side of the vehicle 50 and the portion of the all-around view 62d may provide coverage for a rear of the vehicle 50. Each portion of the all-around view 62a-62d may be one field of view of a camera mounted to the vehicle 50. Each portion of the all-around view 62a-62d may be dewarped and stitched together by the video processors to provide an enhanced video frame that represents a top-down view near the vehicle 50. In an example, the all-around view 62a-62d may be used to provide a representation of a bird's-eye view of the vehicle 50.

The camera systems 100a-100e may provide a representative example of the mechanism for image acquisition. In one example, the camera systems 100a-100e may be implemented as monocular cameras. In another example, the camera systems 100a-100e may be implemented as stereo cameras (e.g., two capture devices implemented in a stereo pair). In some embodiments, the stereo cameras may be horizontally oriented. In some embodiments, the stereo cameras may be vertically oriented. In one example, four stereo cameras (e.g., eight capture devices) may be implemented, with one on each side of the vehicle 50. In some embodiments, the camera systems 100a-100n may be installed as an aftermarket product. For example, the vehicle 50 may be sold without a camera and one or more of the camera systems 100a-100n may be installed on the vehicle 50. The implementation and/or locations of the camera systems 100a-100e on the vehicle 50 and/or the orientation of the camera systems 100a-100e may be varied according to the design criteria of a particular implementation.

Figure 2:
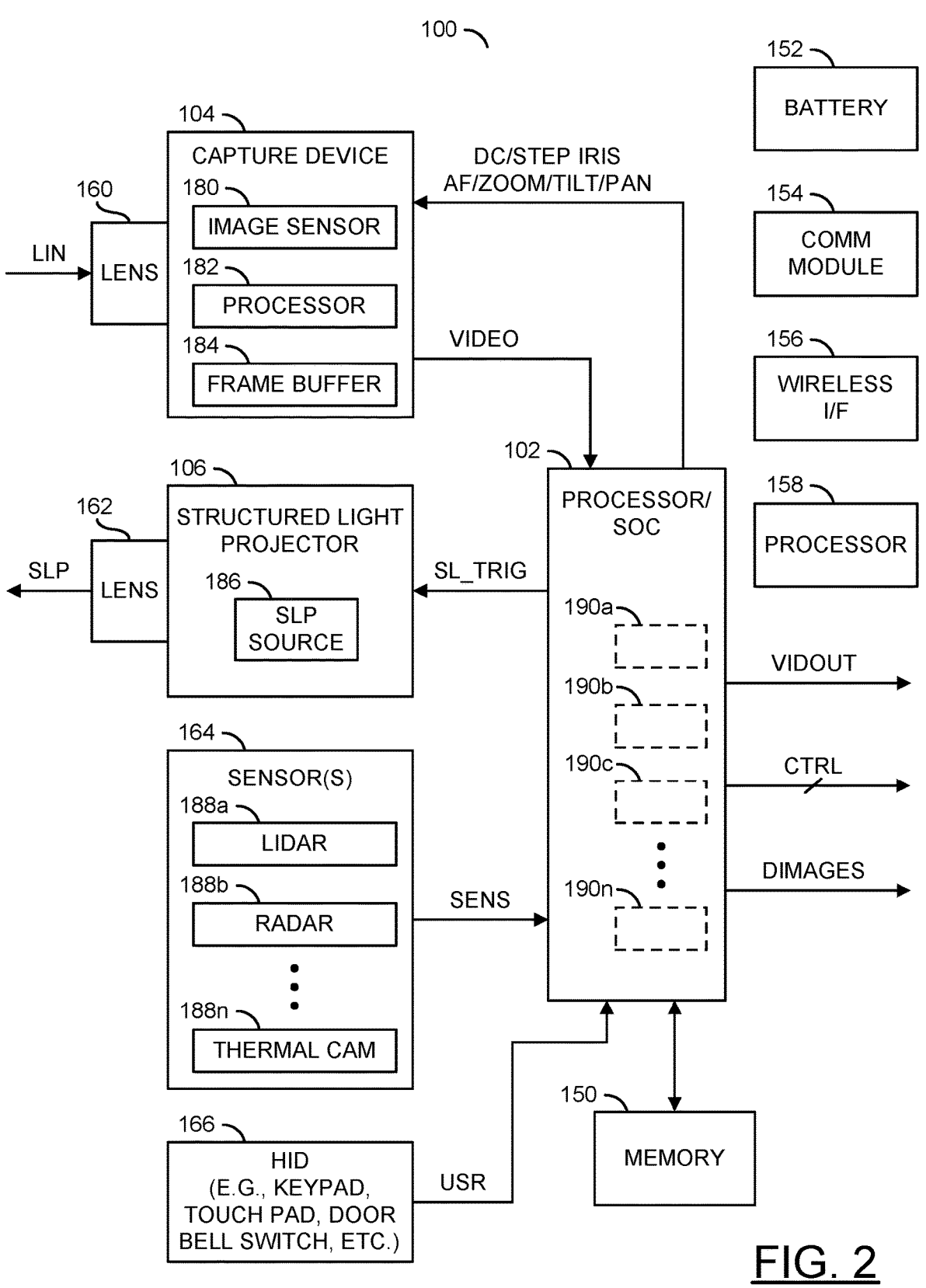
FIG. 2 is a block diagram illustrating a camera system configured to implement driver monitoring with real time feedback.

Referring to FIG. 2, a block diagram illustrating a camera system configured to implement driver monitoring with real time feedback is shown. A camera system 100 is shown. The camera system 100 may be a representative example of the cameras 100a-100n shown in association with FIG. 1. The camera system 100 may comprise a block (or circuit) 102, a block (or circuit) 104 and/or a block (or circuit) 106. The circuit 102 may implement a processor. The circuit 104 may implement a capture device. The circuit 106 may implement a structured light projector.

The processor 102 may be configured to implement an artificial neural network (ANN). In an example, the ANN may comprise a convolutional neural network (CNN). The processor 102 may be configured to implement a large language model (LLM). The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment 40). The capture device 104 may capture the pixel data comprising a background image (e.g., the environment 40) with the speckle pattern.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.). In some embodiments, calculations and/or other operations to initialize and/or generate results for an AI model may be performed locally by the processor 102.

In some embodiments, multiple camera systems may be implemented (e.g., camera systems 100a-100n may operate independently from each other). For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

In some embodiments, the processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be implemented as a dataflow vector processor. In an example, the processor 102 may comprise a highly parallel architecture configured to perform image/video processing and/or radar signal processing.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, radar data cubes, radar detections and/or metadata information. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. In yet another example, the memory 150 may store instructions to perform transformational operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, an event-based sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors. In the example shown, the sensors 164 may comprise blocks (or circuits) 188a-188n. The circuit 188a may implement a lidar. The circuit 188b may implement a radar. The circuit 188n may implement a thermal camera. The sensors 164 may comprise other types of sensors including, but not limited to, motion sensors, ambient light sensors, proximity sensors (e.g., ultrasound, radar, passive infrared, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

The lidar 188*a* may be configured to generate a point cloud of the environment 40 (e.g., representing distances to various objects measured by the lidar 188*a*). The radar 188*b* may be configured to generate a high resolution radar map of the environment 40. The thermal camera 188*n* may be configured to capture a thermal image (e.g., a heat map of the environment 40). Each of the sensors 164 may provide an independent source of information about the environment 40. The number, type of sensor, and/or type of data generated by the sensors 164 may be varied according to the design criteria of a particular implementation.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication. The HID 166 may present a signal (e.g., USR) to the processor 102. The signal USR may comprise the input received by the HID 166.

The processor/SoC 102 may receive the signal VIDEO, the signal SENS and/or the signal USR. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, the signal USR and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, electronic image stabilization, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched, stabilized and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). Similarly, other video processing and/or encoding operations (e.g., stabilization, compression, stitching, cropping, rolling shutter effect correction, etc.) may be performed by the processor 102 locally. For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. In some embodiments, other processors implemented by the apparatus 100 may be generic processors and/or video processors (e.g., a coprocessor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline, a radar signal processing pipeline and/or an AI processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,463, filed on May 12, 2017 (now U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

One or more of the hardware modules 190a-190n may be configured to implement other types of AI models. In one example, the hardware modules 190a-190n may be configured to implement an image-to-text AI model and/or a video-to-text AI model. In another example, the hardware modules 190a-190n may be configured to implement a Large Language Model (LLM). Implementing the AI model(s) using the hardware modules 190a-190n may provide AI acceleration that may enable complex AI tasks to be performed on an edge device such as the edge devices 100a-100n.

One of the hardware modules 190a-190n (e.g., 190c) may implement a sensor fusion module. The sensor fusion module 190c may be configured to receive the data from the sensors 164. In an example, the sensor fusion module 190c may be configured to receive a point cloud generated by the lidar 188a. In another example, the sensor fusion module 190c may be configured to receive a high resolution radar map from the radar module 188b. In yet another example, the sensor fusion module 190c may be configured to receive a thermal image from the thermal camera 188n. The sensor fusion module 190c may be configured to analyze independent sources of data together in order to make inferences about the data (e.g., inferences that may not be capable of determining from each individual data source, alone). The sensor fusion module 190c may be configured to determine the inferences in response to an analysis of the sensor data (e.g., provided by the signal SENS) and the video frames. For example, a combination of information from the video frames and the sensor data may provide additional context about the environment 40.

One of the hardware modules 190a-190n may be configured to perform the virtual aperture imaging. One of the hardware modules 190a-190n may be configured to perform transformation operations (e.g., FFT, DCT, DFT, etc.). The number, type and/or operations performed by the hardware modules 190a-190n may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogeneous processing resources (all circuits 190a-190n may have the same capabilities) or heterogeneous processing resources (two or more circuits 190a-190n may have different capabilities).

Figure 3:
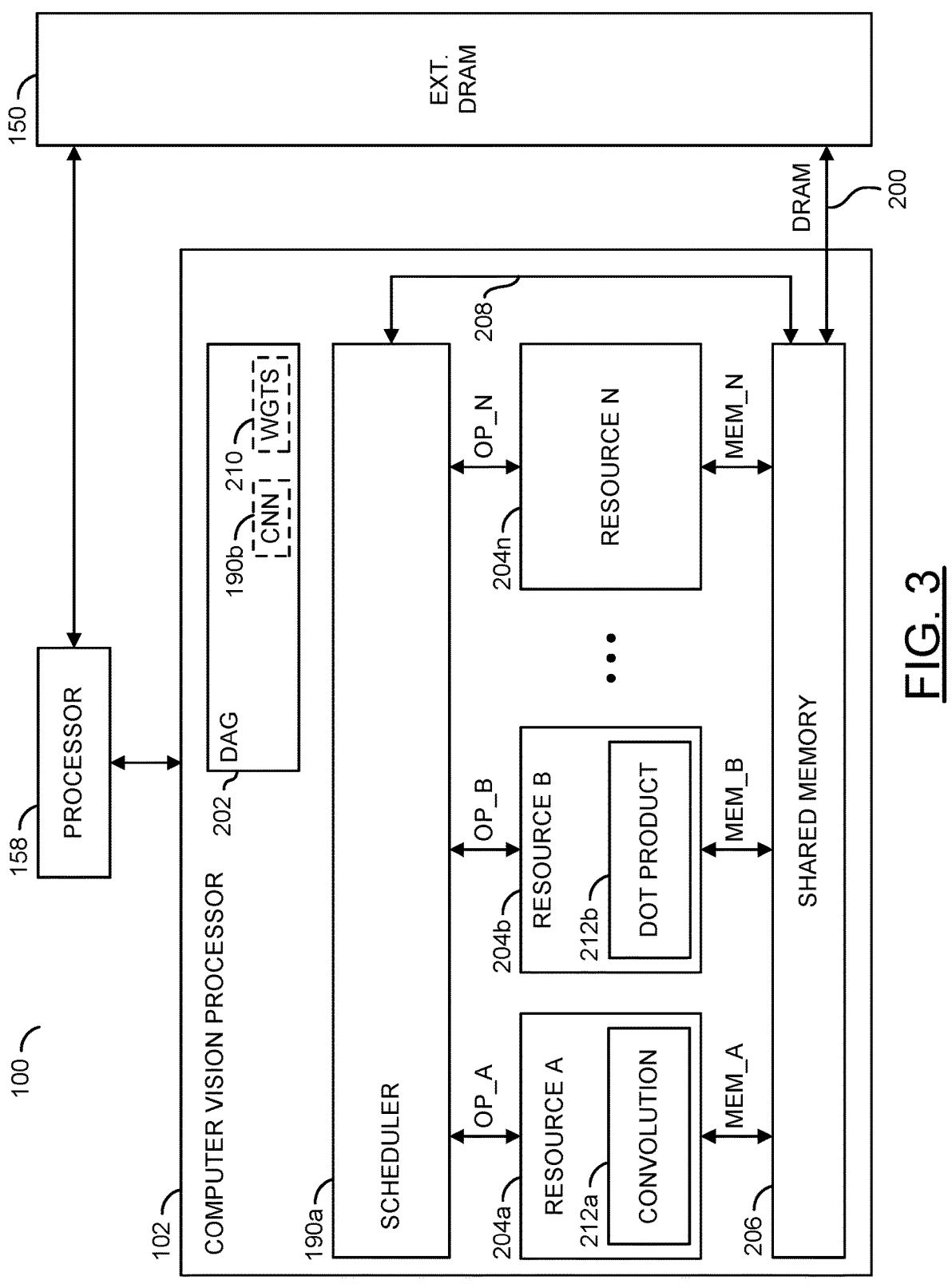
FIG. 3 is a block diagram illustrating processing circuitry of a camera system implementing a convolutional neural network configured to perform object-based detection using neural network models.

Referring to FIG. 3, a block diagram illustrating processing circuitry of a camera system implementing a convolutional neural network configured to perform object-based detection using neural network models is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation, virtual aperture imaging, high resolution radar reconstruction, radar object detection and/or object detection/classification for computer (or machine) vision may be implemented using hardware modules designed to reduce computational complexity and use resources efficiently.

In an example embodiment, the apparatus 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190a, a block (or circuit) 202, one or more blocks (or circuits) 204a-204n, a block (or circuit) 206 and a path 208. The block 202 may implement a directed acyclic graph (DAG) memory. The DAG memory 202 may comprise the CNN module 190b and/or weight/bias values 210. The blocks 204a-204n may implement hardware resources (or engines). The block 206 may implement a shared memory circuit. In an example embodiment, one or more of the circuits 204a-204n may comprise blocks (or circuits) 212a-212n. In the example shown, the circuit 212a and the circuit 212b are implemented as representative examples in the respective hardware engines 204a-204b. One or more of the circuit 202, the circuits 204a-204n and/or the circuit 206 may be an example implementation of the hardware modules 190a-190n shown in association with FIG. 2.

In an example, the processor 158 may be configured to program the circuit 102 with one or more pre-trained artificial neural network models (ANNs) including the convolutional neural network (CNN) 190b having multiple output frames in accordance with embodiments of the invention and weights/kernels (WGTS) 210 utilized by the CNN module 190b. In various embodiments, the CNN module 190b may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190b with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision and/or radar signal processing. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors, radar signal processors and/or AI acceleration processors implemented by the processing circuitry of the camera system 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190b using the circuits 190a, 204a-204n, and 206.

Multiple signals (e.g., OP_A-OP_N) may be exchanged between the circuit 190a and the respective circuits 204a-204n. Each of the signals OP_A-OP_N may convey execution operation information and/or yield operation information. Multiple signals (e.g., MEM_A-MEM_N) may be exchanged between the respective circuits 204a-204n and the circuit 206. The signals MEM_A-MEM_N may carry data. A signal (e.g., DRAM) may be exchanged between the circuit 150 and the circuit 206. The signal DRAM may transfer data between the circuits 150 and 190a (e.g., on the transfer path 208).

The scheduler circuit 190a is generally operational to schedule tasks among the circuits 204a-204n to perform a variety of computer vision, radar signal processing and/or AI acceleration related tasks as defined by the processor 158. Individual tasks may be allocated by the scheduler circuit 190*a* to the circuits 204*a*-204*n*. The scheduler circuit 190*a* may allocate the individual tasks in response to parsing the directed acyclic graphs (DAGs) provided by the processor 158. The scheduler circuit 190*a* may time multiplex the tasks to the circuits 204*a*-204*n* based on the availability of the circuits 204*a*-204*n* to perform the work.

Each circuit 204*a*-204*n* may implement a processing resource (or hardware engine). The hardware engines 204*a*-204*n* are generally operational to perform specific processing tasks. The hardware engines 204*a*-204*n* may be implemented to include dedicated hardware circuits that are optimized for high-performance and low power consumption while performing the specific processing tasks. In some configurations, the hardware engines 204*a*-204*n* may operate in parallel and independent of each other. In other configurations, the hardware engines 204*a*-204*n* may operate collectively among each other to perform allocated tasks.

The hardware engines 204*a*-204*n* may be homogenous processing resources (e.g., all circuits 204*a*-204*n* may have the same capabilities) or heterogeneous processing resources (e.g., two or more circuits 204*a*-204*n* may have different capabilities). The hardware engines 204*a*-204*n* are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204*a*-204*n* may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204*a*-204*n* implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204*a*-204*n* may be implemented solely as hardware circuits. In some embodiments, the hardware engines 204*a*-204*n* may be implemented as generic engines that may be configured through circuit customization and/or software/firmware to operate as special purpose machines (or engines). In some embodiments, the hardware engines 204*a*-204*n* may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204*a*-204*n* may be selected for a particular process and/or thread by the scheduler 190*a*. The scheduler 190*a* may be configured to assign the hardware engines 204*a*-204*n* to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190*a* and/or the hardware engines 204*a*-204*n*). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204*a*-204*n*. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190*a* to the shared memory 206. The transfer path 208 may also be operational to move data from the shared memory 206 to the scheduler circuit 190*a*.

The processor 158 is shown communicating with the computer vision processor 102. The processor 158 may be configured as a controller for the computer vision processor 102. In some embodiments, the processor 158 may be configured to transfer instructions to the scheduler 190*a*. For example, the processor 158 may provide one or more directed acyclic graphs to the scheduler 190*a* via the DAG memory 202. The scheduler 190*a* may initialize and/or configure the hardware engines 204*a*-204*n* in response to parsing the directed acyclic graphs. In some embodiments, the processor 158 may receive status information from the scheduler 190*a*. For example, the scheduler 190*a* may provide a status information and/or readiness of outputs from the hardware engines 204*a*-204*n* to the processor 158 to enable the processor 158 to determine one or more next instructions to execute and/or decisions to make. In some embodiments, the processor 158 may be configured to communicate with the shared memory 206 (e.g., directly or through the scheduler 190*a*, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 4:
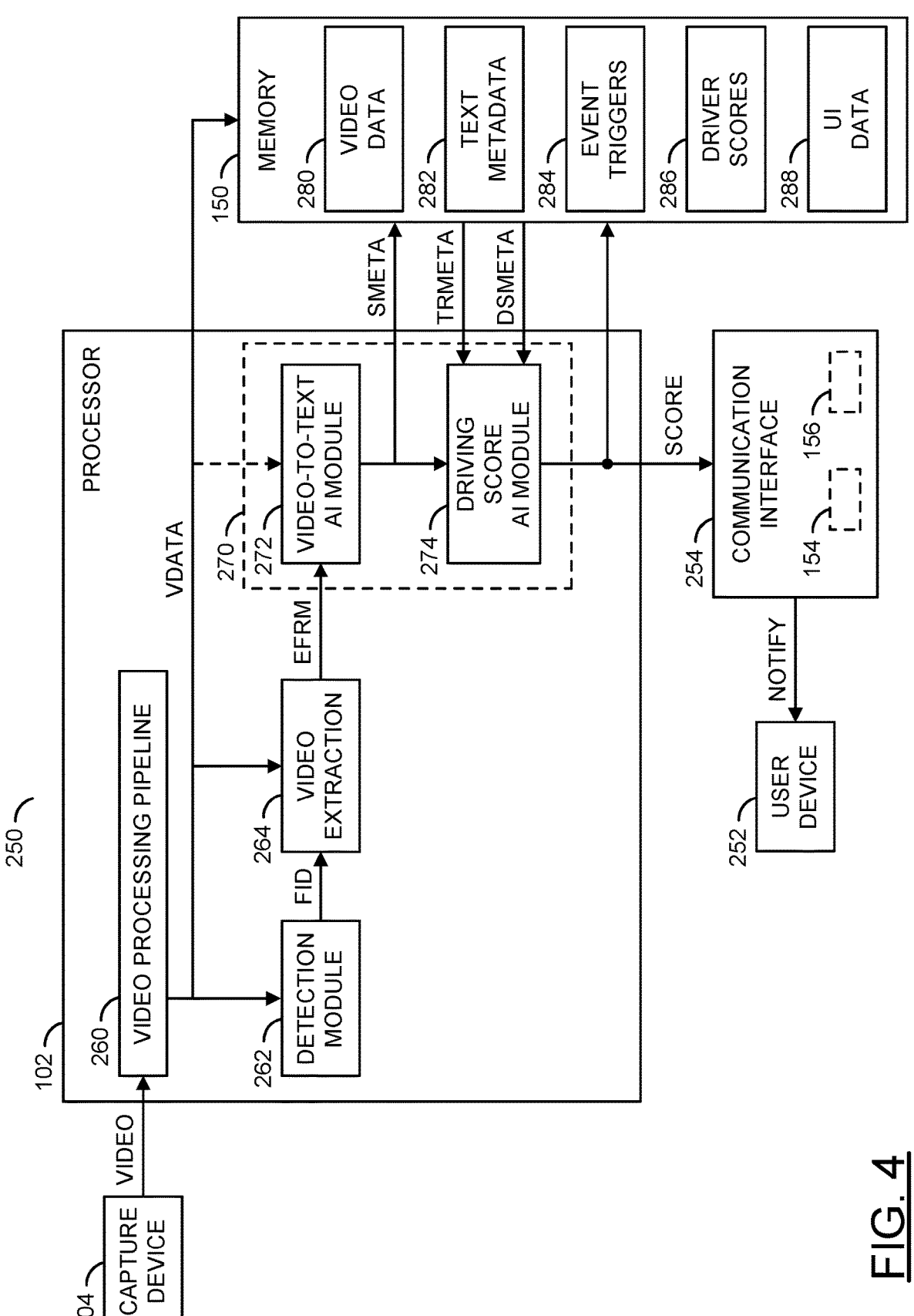
FIG. 4 is a block diagram illustrating AI models implemented by a processor to perform video to text extraction and driver scoring.

Referring to FIG. 4, a block diagram illustrating AI models implemented by a processor to perform video to text extraction and driver scoring is shown. An example implementation 250 is shown. The example implementation 250 may be a representative example of implementing AI models to perform text extraction and/or driver scoring detection on one of the edge devices 100*a*-100*n*. In some embodiments, the AI models may be implemented on the edge devices 100*a*-100*n* (e.g., without offloading computation to a cloud computing service). Whether the AI models may be implemented on the edge devices 100a-100n as shown in the example implementation 250 may depend on the processing capabilities of the processor 102, a power budget and/or a complexity of the AI models implemented.

The example implementation 250 may comprise the processor 102, the capture device 104, the memory 150, a block (or circuit) 252 and/or a block (or circuit) 254. The circuit 252 may implement a user device. The circuit 254 may implement a communication interface of the edge devices 100a-100n. The example implementation 250 may comprise other components (not shown). The number, type and/or arrangement of the components of the example implementation 250 may be varied according to the design criteria of a particular implementation.

The user device 252 may be a device separate from the edge devices 100a-100n. The user device 252 may be configured to connect to the edge devices 100a-100n (e.g., via the communication interface 254). In some embodiments, the user device 252 may connect directly to one or more of the edge devices 100a-100n (e.g., a peer-to-peer connection). In some embodiments, the user device 252 may connect to a network comprising the edge devices 100a-100n (e.g., a local area network, a third party service that facilitates connecting to the edge devices 100a-100n, a cloud computing service, etc.). The method of connecting the user device 252 to the edge devices 100a-100n may be varied according to the design criteria of a particular implementation.

The user device 252 may represent various user devices. In one example, the user device 252 may be a smartphone. In another example, the user device 252 may be a desktop computer, a laptop computer, a tablet computing device, a smartwatch, a security terminal, etc. The types devices used as the user device 252 may be varied according to the design criteria of a particular implementation.

The user device 252 may enable end users to communicate with the edge devices 100a-100n and/or other networks. In one example, a companion application may be configured to operate on the user device 252. The companion application may enable users to adjust settings of the edge devices 100a-100n. The companion application may enable users to view video captured by the edge devices 100a-100n (e.g., directly from the edge devices 100a-100n and/or streamed via a cloud service). Generally, the user device 252 may comprise a display (e.g., for image and/or video output), a speaker (e.g., for audio output), an input device (e.g., a keyboard, a touchscreen display, a microphone, etc.) and/or a communication device.

The user device 252 may enable an end user to provide input to one or more of the edge devices 100a-100n. For example, the end user may set various preferences. The preferences may comprise the types of notifications to receive (e.g., text, push, audio, etc.), the types of events to receive notifications about (e.g., types of objects to detect, faces to detect, thresholds for factors such as audio and motion thresholds, etc.) and/or urgency level (e.g., alert threshold) settings. The user device 252 may enable the end user to enter queries for searching video data captured, provide criteria for notification rules, view an inventory of items detected, receive driving improvement suggestions, receive navigational advice, receive security alerts, receive a driving score, etc., The user device 252 may enable the end user to tag video captured for providing training data to the various AI models.

The user device 252 may enable the end user to receive output from one or more of the edge devices 100a-100n. In one example, the end user may receive notifications from the edge devices 100a-100n (or through an intermediary such as a cloud computing service) via the user device 252. In another example, the end user may receive a video stream from the edge devices 100a-100n via the user device 252. In yet another example, the end user may receive search results in response to a query (e.g., selective portions of the video data captured) from the edge devices 100a-100n via the user device 252. In the example implementation 250 shown, the user device 252 may receive a notification in response to objects and/or events detected in the video data based on notification rule settings and/or criteria determined by AI models and/or user preferences.

The communication interface 254 may facilitate communication between the user device 252, one of the edge devices 100a-100n and/or other networks. The communication interface 254 may comprise the communication module 154 and/or the wireless interface 156. The communication interface 254 may be configured to receive a signal (e.g., SCORE). The communication interface 254 may be configured to generate a signal (e.g., NOTIFY). In one example, the signal NOTIFY may be generated in response to the signal SCORE. The signal NOTIFY may be presented to the user device 252.

The processor 102 may be configured to receive the signal VIDEO from the capture device 104. The processor 102 may be configured to generate a signal (e.g., VDATA), a signal (e.g., SMETA) and/or the signal SCORE. The processor 102 may be configured to receive a signal (e.g., TRMETA) and/or a signal (e.g., DSMETA). The signal VDATA may comprise processed video data. The signal SMETA may comprise text description metadata (e.g., smart metadata). The signal TRMETA may comprise a feature set and/or criteria (e.g., video detection and/or event detection criteria) for detecting the triggers. The signal DSMETA may comprise data about a driving score. The signal SCORE may provide an indication that a trigger threshold has been exceeded, that an object/event has been detected and/or an alert/suggestion to the driver 60. The signal NOTIFY may comprise a notification, a type of alert, audio, text and/or video. Generally, the processor 102 may communicate the signal VDATA and/or the signal SMETA to the memory 150 and the signal SCORE to the communication interface 254 and/or the memory 150, and receive the signal TRMETA and/or the signal DSMETA from the memory 150. The number, type and/or data communicated by the signals in the example implementation 250 may be varied according to the design criteria of a particular implementation.

The processor 102 may comprise a block (or circuit) 260, a block (or circuit) 262, a block (or circuit) 264 and/or a block (or circuit) 270 The circuit 260 may implement a video processing pipeline. The circuit 262 may implement a detection module. The circuit 264 may implement a video extraction module. The circuit 270 may implement an AI module. The processor 102 may comprise other components (not shown). One or more of the components 260-270 may be implemented by programming the hardware modules 190a-190n. The number, type and/or arrangement of the components of the processor 102 may be varied according to the design criteria of a particular implementation.

The video processing pipeline 260 may be configured to receive the signal VIDEO. The video processing pipeline 260 may be configured to generate the signal VDATA in response to the signal VIDEO. The video processing pipeline 260 may be configured to present the signal VDATA to the memory 150 (e.g., for storage), the detection module 262, the video extraction module 264 and/or the AI module 270.

The video processing pipeline 260 may be configured to receive the pixel data in the signal VIDEO. The video processing pipeline 260 may be configured to process the pixel data arranged as video frames. The signal VDATA may comprise the video frames generated by the video processing pipeline 260. In some embodiments, the video frames generated by the video processing pipeline 260 may comprise encoded video frames. In some embodiments, the video frames generated by the video processing pipeline 260 may comprise raw data that may be used for various types of analysis (e.g., motion detection, object detection, cropping, auto-balance, depth analysis, behavior detection, cropping, stabilization, upscaling, downscaling, dewarping, formatting for an output device, etc.) as described in association with FIG. 2. The video processing pipeline 260 may be configured to prepare the raw pixel data for further analysis by the components 262-270, for communication to other devices and/or for storage in the memory 150.

The detection module 262 may be configured to receive the signal VDATA. The detection module 262 may be configured to generate a signal (e.g., FID). The signal FID may be generated in response to the signal VDATA. The signal FID may comprise a frame ID and/or frame numbers. The signal FID may be presented to the video extraction module 264.

The detection module 262 may be configured to detect particular types of information in the video data. In an example, the detection module 262 may comprise a detection threshold and/or a preliminary detection criteria. For example, the detection threshold and/or criteria may be a user defined value. The detection module 262 may perform analysis on the video data to determine whether a particular type of information in the video data exceeds the detection threshold and/or meets the preliminary detection criteria. In one example, the detection module 262 may implement the CNN module 190b to perform object and/or behavior detection. The detection module 262 may determine the frame numbers and/or timestamps that correspond to video data that has the particular type of information that exceeds the detection threshold and/or meets the preliminary detection criteria.

In one example, the detection module 262 may implement motion detection. The detection threshold may be a motion threshold and the detection module 262 may be configured to detect motion in the video data. In another example, the detection module 262 may implement object detection. The preliminary detection criteria may be a particular type of object (or objects) and the detection module 262 may be configured to perform object detection in the video data. In yet another example, the detection module 262 may implement facial detection. The preliminary detection criteria may be one or more pre-defined faces and the detection module 262 may be configured to recognize faces in the video data. In still another example, the detection module 262 may implement audio detection. The detection threshold may be a volume level and/or the detection criteria may be a particular type of audio signature (e.g., detecting particular types of sounds such as animal noises, broken glass, screams, etc.) and the detection module 262 may be configured to analyze the audio captured with the video data. The type of detections performed by the detection module 262 and/or the detection threshold used may be a user-defined preference and/or may be varied according to the design criteria of a particular implementation.

The detection module 262 may be implemented to detect initial conditions for performing more advanced analysis of the video data. The meeting and/or exceeding of the detection threshold/criteria may be used as a trigger for performing an analysis by the AI module 270. For example, instead of performing video-to-text operations and/or analyzing for triggers on all of the video data, the detection module 262 may be used to detect video frames that are likely to have interesting and/or relevant information. In one example, a vehicle sentry camera operating while a vehicle is parked may generally capture the same scene (e.g., an empty driveway or other vehicle in a parking lot). Continually generating smart metadata describing the same scene may not be beneficial and/or unnecessarily consume resources. The detection module 262 may be configured to detect when the scene changes (e.g., a person approaches the vehicle, people walking nearby in a parking lot, an intruder tries to break into the vehicle, etc.). Implementing the detection module 262 may be optional. For example, for the camera system 100e monitoring the driver 60, many of the video frames may seem similar (e.g., detecting the occupants of the vehicle). However, the subtle changes in the actions of the driver 60 may be important for determining the behavior of the driver 60 (e.g., whether the eyes are open/closed).

The video extraction module 264 may be configured to receive the signal VDATA and/or the signal FID. The video extraction module 264 may be configured to generate a signal (e.g., EFRM). The signal EFRM may be generated in response to the signal VDATA and the signal FID. The signal EFRM may comprise extracted video frames. For example, the signal EFRM may comprise a subset of captured video frames with less than all of the video frames in the signal VDATA. The signal EFRM may be presented to the AI module 270.

The video extraction module 264 may be configured to select a subset of the video data. The detection module 262 may provide timestamps, a range of timestamps, frame numbers and/or a range of frame numbers to the video extraction module 264. The video extraction module 264 may extract the video frames from the video data in response to the timestamps, range of timestamps, frame numbers and/or ranges of frame numbers. Generally, the video extraction module 264 may select the subset of the video data that may comprise the pre-defined objects of interest, events of interest, motion, recognized faces, audio features, etc. The extraction of the subset of the video data may be optional (e.g., the operations performed by the detection module 262 and the extraction module 264 may not necessarily be performed).

The extraction of the subset of the video data may enable a limited group of video data to be analyzed using the AI module 270. For example, instead of performing the computationally intensive operations of the video-to-text AI and/or the driving rule AI on all of the video data, the combination of the detection module 262 and the extraction module 264 may select the video frames that may be most likely to be interesting to the end user, most likely to comprise an behavior of the driver and/or most likely to comprise the trigger for determining the adjustment to the driver score. In some embodiments, the video frames determined to be most likely to be interesting to the end user may be learned based on information provided by the AI module 270. For example, the AI module 270 may learn the types of events that the end user finds interesting (e.g., requests notifications for) and may provide the information about the interesting events to the detection module 262. In some embodiments, the signal TRMETA may comprise feature set information that corresponds to the criteria for the triggers and the AI module 270 may communicate the feature set to the detection module 262. The number of video frames extracted by the extraction module 264 may be varied according to the design criteria of a particular implementation.

The AI module 270 may be configured to implement one or more AI models and/or AI modules. In some embodiments, the AI module 270 may be configured to implement a single AI model. For example, the single AI model may be configured to implement video-to-text analysis. The video-to-text analysis may generate a plain text (e.g., natural language that may be human readable) description of the content of the video frames. The single AI model may be further configured to evaluate triggers and/or determine driver scoring. For example, the single AI model may simultaneously analyze the video data to create the text, and also continuously evaluate whether triggers have occurred using the text as the text is created (e.g., in real-time). In some embodiments, the AI module 270 may implement multiple AI models. For example, a text-to-speech AI model may be configured to perform computer vision operations that generates the text description of what has happened and/or what has been detected in the video data. A driving score AI model may be configured to analyze the generated text (e.g., instead of the video data) to determine whether the criteria for a trigger has been met. Analyzing the text instead of the video data for the triggers may provide a less computationally intensive analysis than generating text and then re-analyzing the video for the notification rule criteria.

In the example shown, the AI module 270 may comprise a block (or circuit) 272 and/or a block (or circuit) 274. The circuit 272 may implement a video-to-text AI module (or model). The circuit 274 may implement a driving score AI module (or model). The AI module 270 may comprise other components (not shown). Generally, the AI module 270 may comprise hardware configured to implement DAGs and/or LLMs. The number, and/or type of the AI models implemented by the AI module 270 may be varied according to design criteria of a particular implementation.

The video-to-text AI module 272 may be configured to receive the video data from the signal VDATA or the video data from the signal EFRM. For example, the video-to-text AI module 272 may be configured to operate on all of the video data (e.g., the signal VDATA) and/or the subset of the video frames likely to comprise an event of interest (e.g., the signal EFRM). The video-to-text AI module 272 may be configured to generate the signal SMETA. The signal SMETA may be generated by the video-to-text AI module 272 in response to the signal VDATA and/or the signal EFRM. The video-to-text AI module 272 may present the signal SMETA to the memory 150 and/or the driving score AI module 274.

The video-to-text AI module 272 may be configured to perform an analysis of the video data and generate the smart metadata. The smart metadata may be presented in the signal SMETA. The video-to-text AI module 272 may be configured to generate the smart metadata by performing natural language processing and generate natural language text based on learned patterns and/or relationships between words in a particular spoken/written human language. The smart metadata may comprise a full text description of the video frames. The smart metadata may comprise a plain language description of the objects in the video frames, the context of the video frames, the colors in the video frames, the arrangement of the visual elements in the video frames, the behavior of objects in the video frames, the location of objects in the video frames, the types of objects in the video frames, etc.

The smart metadata may be determined based on not only a current video frame, but also previous video frames and later video frames. For example, a single video frame of an object (e.g., a hand) in the air may not provide sufficient information to determine a location and/or behavior of the object. Analyzing the previous and later video frames may provide context to enable the video-to-text AI module 272 to determine behavior such as whether the object in the air is being raised up or falling down. In some embodiments, the smart metadata may provide an initial description (e.g., a best guess) based on the content of the current and previous video frames to provide real-time analysis, and then update the smart metadata as subsequent video frames are analyzed to update the initial description after more context becomes available (e.g., the initial description may describe an object as lifting up, but after subsequent video frames are analyzed, the object may be determined to be falling down). The video-to-text AI module 272 may be configured to determine behaviors of objects in the video frames analyzed. For example, the behavior may comprise a classification of movements of the driver 60 and/or a location of the objects (e.g., the vehicle 50) in response to various objects, behaviors and/or patterns detected. For example, the video-to-text AI module 272 may determine that a video frame comprises a red light, the distance to the red light, the relationship of the red light to an intersection, where the intersection is located with respect to the vehicle 50, whether the red light is applicable to the vehicle 50, etc. The method of describing the contents of the video data may be varied according to the design criteria of a particular implementation.

In one example, the video-to-text AI module 272 may implement a video-to-text AI model. In one example, the AI model implementing the video-to-text analysis may be a transformer network. In another example, the AI model implementing the video-to-text analysis may be performed using a convolutional neural network. Generally, the AI model implementing the video-to-text analysis may be a type of neural network. In one example, the AI model implementing the video-to-text analysis may provide bootstrapping language-image pre-training with frozen image encoders and large language models (e.g., BLIP-2). The AI model may be implemented based on a generic and efficient pre-training strategy that bootstraps vision-language pre-training from off-the-shelf, frozen, pre-trained image encoders and frozen large language models. The AI model may comprise a querying transformer pre-trained with a first stage that bootstraps vision-language representation learning from a frozen image encoder and a second stage that bootstraps vision-to-language generative learning from a frozen language model. In another example, the AI model may be implemented based on a Flamingo80B model. The AI model implemented by the video-to-text AI module 272 may be configured with emerging capabilities of zero-shot image-to-text generation that may follow natural language instructions. Details of the video-to-text AI module 272 may be described in U.S. patent application Ser. No. 18/210,931, filed on Jun. 16, 2023, appropriate portions of which are incorporated by reference. The type of AI model implemented for video-to-text may be varied according to the design criteria of a particular implementation.

In some embodiments, the driving score AI module 274 may be configured to receive the signal SMETA. For example, the driving score AI module 274 may determine whether the trigger has been detected based on the text description provided by the smart metadata for the video frames. In some embodiments, the driving score AI module 274 may be configured to receive the signal VDATA and/or the signal EFRM. For example, the driving score AI module 274 may determine whether the trigger has been determined by analyzing the video data based on computer vision operations. The driving score AI module 274 may receive the signal TRMETA and/or the signal DSMETA and generate the signal SCORE. The driving score AI module 274 may receive the signal TRMETA comprising the criteria for detecting the triggers. The driving score AI module 274 may receive the signal DSMETA comprising the driving scores for the driver 60 and/or suggested improvements for the driver 60. The driving score AI module 274 may generate the signal SCORE in response to the signal TRMETA, the signal DSMETA and the signal SMETA and/or the signal VDATA (or the signal EFRM). The driving score AI module 274 may receive the signal TRMETA and/or the signal DSMETA from the memory 150. The driving score AI module 274 may present the signal SCORE to the communication interface 254 and/or the memory 150.

The driving score AI module 274 may be configured to perform a trigger analysis for the video frames. The generation of the driving score may be determined in response to the video data (or the text description of the video data in the signal SMETA) and the criteria for the triggers provided by the signal TRMETA. The behavior of the driver 60 detected in the video frame and/or objects in the video frames (e.g., behavior of the pedestrians and/or other vehicles detected) may be compared to the triggers and/or the driving score data. Each of the triggers may have an individual criteria threshold.

The triggers may comprise one condition or multiple conditions. For example, a trigger with a single criteria may be to adjust a driving score when "the driver is driving too close to a vehicle in front" (e.g., a particular behavior of the vehicle 50). In another example, a trigger with multiple criteria may be to generate a notification when "the driver stops too fast at a red light" (e.g., an action performed by the driver, such as stopping, and performed in particular circumstances, such as at a red light). The triggers may be a user-defined variable (e.g., provided via the HID 166) and/or may comprise a pre-defined list. The trigger analysis performed may enable the driving score generated to be relevant to a particular scenario (e.g., driving safety for a teenager, efficiency for a delivery truck, etc.). For example, the trigger analysis may be configured to prevent false positive alerts and/or prevent overwhelming the end user with notifications for a fleet manager that is in charge of a large fleet of vehicles. The trigger analysis performed by the driving score AI module 274 may be performed independent from the detection analysis, the video-to-text analysis and/or searching the events detected by the end user.

The driving score AI module 274 may implement an AI model. The AI model implemented by the driving score AI module 274 may be configured to analyze the video frames and/or the smart metadata describing the video frames to determine whether criteria for one or more triggers has been met. The AI model implemented by the driving score AI module 274 may perform computer vision operations. In one example, the AI model implemented by the driving score AI module 274 may implement an ANN such as a convolutional neural network. The driving score AI module 274 may be configured to determine whether the video frames comprise information that may be worthwhile to present to the end user and/or for evaluating the behavior of the driver 60. The trigger analysis may be performed based on the objects detected, particular faces detected, behavior of objects detected in the video frames, etc.

In some embodiments, the particular types of video content that may comprise worthwhile information may be pre-defined based on preferences selected by the user (e.g., user preferences selected using the HID 166). In some embodiments, the particular types of video content that may comprise worthwhile information may be learned in response to other notification rules made by the end user and/or queries provided by the end user. For example, if the end user regularly asks about what time of day the drivers are driving, then the driving score AI module 274 may train the AI model to provide notification rules for the video data that comprises data about the time of day. In another example, if the end user regularly asks about when a particular driver (e.g., an employee) is speeding but does not ask about whether another driver (e.g., another employee) is speeding, then the driving score AI module 274 may train the AI module to provide triggers that generate alerts for the driver that is suspected of speeding and disable triggers that detect speeding for the driver that is known not to speed. The particular criteria for the triggers for various types of video content may be varied according to the design criteria of a particular implementation.

The learned behavior and/or particular triggers of the end user may be used to individualize the driving score and/or suggested improvements generated for each end user. The driving score AI module 274 may be configured to select distinct sets of triggers for multiple end users (e.g., drivers). Some of the end users may have common driving scores (e.g., all users may have driving scores for impacts, running stop signs, driving while drowsy, etc.). Other users may have specific preferences (e.g., a parent may want to be notified if a child is driving in particular locations or on particular roads). In some embodiments, the driving score AI module 274 may be configured to parse natural language input from each user to determine the trigger preferences. For example, the end user may input a natural language description of the event (e.g., "send me an audio notification when Alice has left the city limits").

In some embodiments, a separate LLM AI module may be implemented to parse the natural language preference input and convert the natural language into criteria for the triggers into a format usable by the driving score AI module 274. In one example, a user with a valuable and/or perishable cargo in the vehicle 50 may prefer to receive a notification every time the cargo area is above a particular threshold temperature and/or if the driver 60 is turning too fast (e.g., low threshold for sudden vehicle moves), but may not care about temperature or sudden movements when the cargo hold is empty. Similarly, another user may not care about sudden accelerations when a delivery is urgent, but may prefer to receive an immediate notification when a lane is changed without an indicator (e.g., low urgency for acceleration and high urgency for indicator use). The criteria and/or triggers for each user may change over time as behaviors and/or preferences change. The driving score AI module 274 may be configured to learn the preferences of each individual user based on the queries asked when searching for videos, pre-defined input preferences, the triggers created and/or the video results selected from search results provided.

The signal SCORE may be generated based on the triggers detected and/or the associated adjustment to the driving score corresponding to the triggers detected. In some embodiments, the triggers may comprise multiple thresholds and the signal SCORE may be generated based on the particular thresholds met for the triggers. For example, the trigger threshold may comprise a numerical value (e.g., a 1 to 5 scale, a binary scale, a three state scale, etc.) for an urgency level for the trigger that may be determined for various events detected. For example, detecting nothing may not meet any trigger, resulting in no notification generated and/or no driving score adjustment, detecting a sudden lane change may meet a first urgency level (e.g., alert threshold) criteria, resulting in a text notification and a small deduction to the driving score, and running a red light may meet a second urgency level (e.g., alert threshold) criteria, resulting in an audio alert to the driver and the fleet manager and a large deduction to the driving score. The driving score AI model 274 may provide relevant notifications for behavior of the driver 60 and/or a value of a driving score adjustment for the behavior of the driver 60. The granularity of alerts and/or the driving score adjustment for each level of alert for each trigger may be varied according to the design criteria of a particular implementation.

The communication interface 254 may generate the signal NOTIFY in response to the signal SCORE. The signal NOTIFY may comprise the notification generated in response to the trigger analysis performed by the driving score AI model 274. In some embodiments, the notification may comprise contextual information about the particular detection. For example, the driving score AI model 274 may generate the signal SCORE with the smart metadata in the signal SMETA. Providing the signal SCORE with the smart metadata may enable the signal NOTIFY to comprise a human readable description of the event detected. For example, the signal NOTIFY may comprise a plain language description of the event in addition to (or instead of) providing the video data (e.g., the notification may provide a text description that a harsh brake has been detected). In some embodiments, the signal NOTIFY may comprise the video data. For example, the signal NOTIFY may comprise a video clip (e.g., extracted by the video extraction module 264) of the driver 60 (e.g., captured using the camera system 100e) and/or the all-around view (e.g., captured by the camera systems 100a-100d) for the user to view on the user device 252 to review the scenario that resulted in the notification and/or adjustment to the driving score. In some embodiments, the signal NOTIFY may comprise the video to provide a recommendation of a different action that could have been taken to avoid the driving score deduction (e.g., an indication of where the driver should have started stepping on the brake after a harsh brake trigger has been detected) and/or provide a description of why avoiding the trigger is important (e.g., indicate that harsh braking causes faster wear on the brakes than smooth braking). The format of the notification provided may be varied according to the design criteria of a particular implementation.

The memory 150 may comprise a block (or circuit) 280, a block (or circuit) 282, a block (or circuit) 284, a block (or circuit) 286 and/or a block (or circuit) 288. The circuit 280 may comprise video data storage. The circuit 282 may comprise text metadata. The circuit 284 may comprise event triggers. The circuit 286 may comprise driver scores. The circuit 288 may comprise user interface (UI) data. The memory 150 may comprise other types of data storage (not shown). The number, type and/or arrangement of the data stored by the memory 150 may be varied according to the design criteria of a particular implementation.

The video data storage 280 may store the video frames generated by the video processing pipeline 260. The memory 150 may receive the signal VDATA from the video processing pipeline 260 and store the video frames as the video data storage 280. The video data storage 280 may provide storage for the video frames to be output to a video device (e.g., a monitor) and/or streamed to another device (e.g., the user device 252).

The text metadata 282 may store the smart metadata generated by the video-to-text AI module 272. The memory 150 may receive the signal SMETA from the video-to-text AI module 272 and store the smart metadata as the text metadata 282. The text metadata storage 282 may provide storage for the smart metadata to enable determining behavior of the driver 60 and/or the vehicle 50 and/or to enable the driving score AI module 274 to determine whether the criteria for a trigger has been met and/or generating suggestions for driver improvement. The text metadata 282 may be associated with the video data storage 280. In an example, each of the video frames stored in the video data storage 280 may comprise a timestamp and the smart metadata in the text metadata 282 may comprise the timestamp to enable the smart metadata to correspond to the video frames. Criteria for notification rules provided by the end user may be compared to the smart metadata in the text metadata 282 in order to generate the notification. The text metadata 282 may comprise the full text description of the video contents.

The event triggers 284 may store the criteria for each of the events that may trigger an adjustment to the driving score, trigger a notification and/or trigger a recommendation to the driver 60. In some embodiments, the memory 150 may be configured to store a pre-defined list of triggers as the event triggers 284. For example, various driving scenarios that may be commonly detected and/or potential safety issues may be pre-defined. In some embodiments, the memory 150 may be configured to receive input from the end user (e.g., the signal USR), which may be stored as the event triggers 284. For example, a parent and/or a fleet manager may select particular events of interest. The source of the event triggers 284 and/or the particular events used for the event triggers 284 may be varied according to the design criteria of a particular implementation.

The event triggers 284 may be used to generate the signal TRMETA. The event triggers 284 may comprise distinct criteria for each type of behavior and/or driving scenario in order to evaluate the driver 60. In an example, the end user may select a particular type of behavior for detection (e.g., a fleet manager may desire to detect when drivers get distracted when passing other large semi-trucks because the fleet manager is concerned that drivers are talking to each other while passing). The event triggers 284 may be provided as plain text (e.g., "send me text message when a driver displays signs of distraction anytime another transport truck is near the driver"). For example, the event triggers 284 may store reference images of the end user to associate with a particular driver. In another example, the event triggers 284 may store reference images of typical signs of distraction (e.g., blinking, talking, looking at a smartphone or radio, etc.). In yet another example, the event triggers 284 may store reference images of types of transport vehicles (e.g., utility vans, semi-trucks, other vehicles in the same vehicle fleet, etc.).

In some embodiments, the event triggers 284 may comprise reference images. In some embodiments, the event triggers 284 may comprise natural text descriptions that may be used for comparison with the smart metadata in the text metadata 282. In some embodiments, the event triggers 284 may comprise criteria for the vehicle 50 (e.g., when the vehicle 50 does not make a complete stop at a stop sign). In some embodiments, the event triggers 284 may comprise criteria for the driver 60 (e.g., when the driver 60 is not looking at the road). Generally, the event triggers 284 may comprise at least a detection associated with the driver 60 and/or a detection associated with the vehicle 50. In some embodiments, the event triggers 284 may comprise both a detection associated with the driver 60 and a detection associated with the vehicle 50 (e.g., driver is drowsy and vehicle is braking late). In some embodiments a trigger may be a negative rule that suppresses a notification and/or does not make an adjustment (e.g., "Do not send a notification if the driver is stopping frequently" for a delivery truck that makes frequent stops). The particular format of the event triggers 284 and/or the number of the event triggers 284 stored may be varied according to the design criteria of a particular implementation.

The driver scores 286 may be configured to store an evaluation of the driver 60 and/or the vehicle 50. The driver scores 286 may comprise an adjustment to the driving score for each of the event triggers 284. For example, when the driving score AI module 274 detects one of the triggers stored in the event triggers 284, the driver scores 286 may update the driving score for the driver by the amount associated with the trigger detected. In some embodiments, the adjustments to the driving score may comprise a numerical value (e.g., a 5 point deduction for changing lanes without indicating, a 5 point increase for making a complete stop at a stop sign, a 10 point deduction for looking at a smartphone, etc.). For example, the driver 60 may start with an initial total amount of points (e.g., 100 points) and the deductions may subtract the pre-defined amount associated with the trigger detected from the total amount of points (or add to the total amount of points for good behavior). In some embodiments, the driver scores 286 may comprise an overall evaluation of the driver 60 for a particular route. In an example, the driving score AI module 274 may analyze all the text metadata 282 for a particular trip, determine optimal and/or recommended behavior for the particular trip based on the analysis of the text metadata 282 and then compare the triggers detected in the text metadata 282 for the particular trip with the recommended behavior to generate the overall evaluation and then store the overall evaluation as the driver scores 286 (e.g., the driver achieved 86% of the recommended behavior because the driver drove too long without taking a break, accelerated too quickly 3 times, drove over the speed limit for 20 minutes, etc.). In still another example, the driving score may be determined using a neural network that takes as an input the number of miles driven, the number of instances of different behavior and returns a probability of an incident as a driver score. In yet another example, the driver scores 286 may comprise natural language recommendations (e.g., driver should shoulder check before changing lanes, the driver should decelerate more smoothly, the driver should be more cautious when approaching yellow lights, etc.). In some embodiments, the driver scores 286 may further comprise justification descriptions for the particular score adjustments. For example, some drivers may respond better (e.g., change behavior) when given a reason for a deduction (e.g., accelerating more slowly will save money by consuming less fuel, doing a shoulder check helps ensure that a vehicle isn't in a blind spot, braking slowly will save money by reducing wear on your brakes, etc.). The particular type of driving score implemented may be varied according to the design criteria of a particular implementation.

The driver scores 286 may be associated with a particular driver and/or a particular vehicle. For example, associating a driving score with a particular vehicle may be used to identify issues with the vehicle (e.g., if multiple drivers appear to be braking too late, then there may be an indication that the brakes on the vehicle need replacing). The driver scores 286 may be cumulative (e.g., apply to all trips taken by a particular driver) and/or provided per trip (e.g., multiple driving scores for the same driver). Information from the driver scores 286 may be communicated to the driving score AI module 274 using the signal DSMETA. The signal DSMETA may provide data to enable the driving score AI module 274 to update the driving scores based on the triggers detected. The signal DSMETA may provide a score and/or recommendation for the driving score AI module 274 to communicate via the signal SCORE. The signal SCORE may be generated by the driving score AI module 274 to provide updates and/or adjustments to the driver scores 286 based on the triggers detected for a particular driver/vehicle.

The UI data 288 may comprise an interface layout that may enable the user device 252 to interact with the edge devices 100a-100n. In one example, the edge devices 100a-100n may provide a web-based interface to enable the end user to receive information from the edge devices 100a-100n and/or provide input to the edge devices 100a-100n. The web-interface may be generated based on the UI data 288. Details about the UI data 288 may be illustrated in association with FIG. 11. The UI data 288 may facilitate the output generated by and the input presented to the edge devices 100a-100n. The layout of the UI data 288 may be varied according to the design criteria of a particular implementation.

Figure 5:
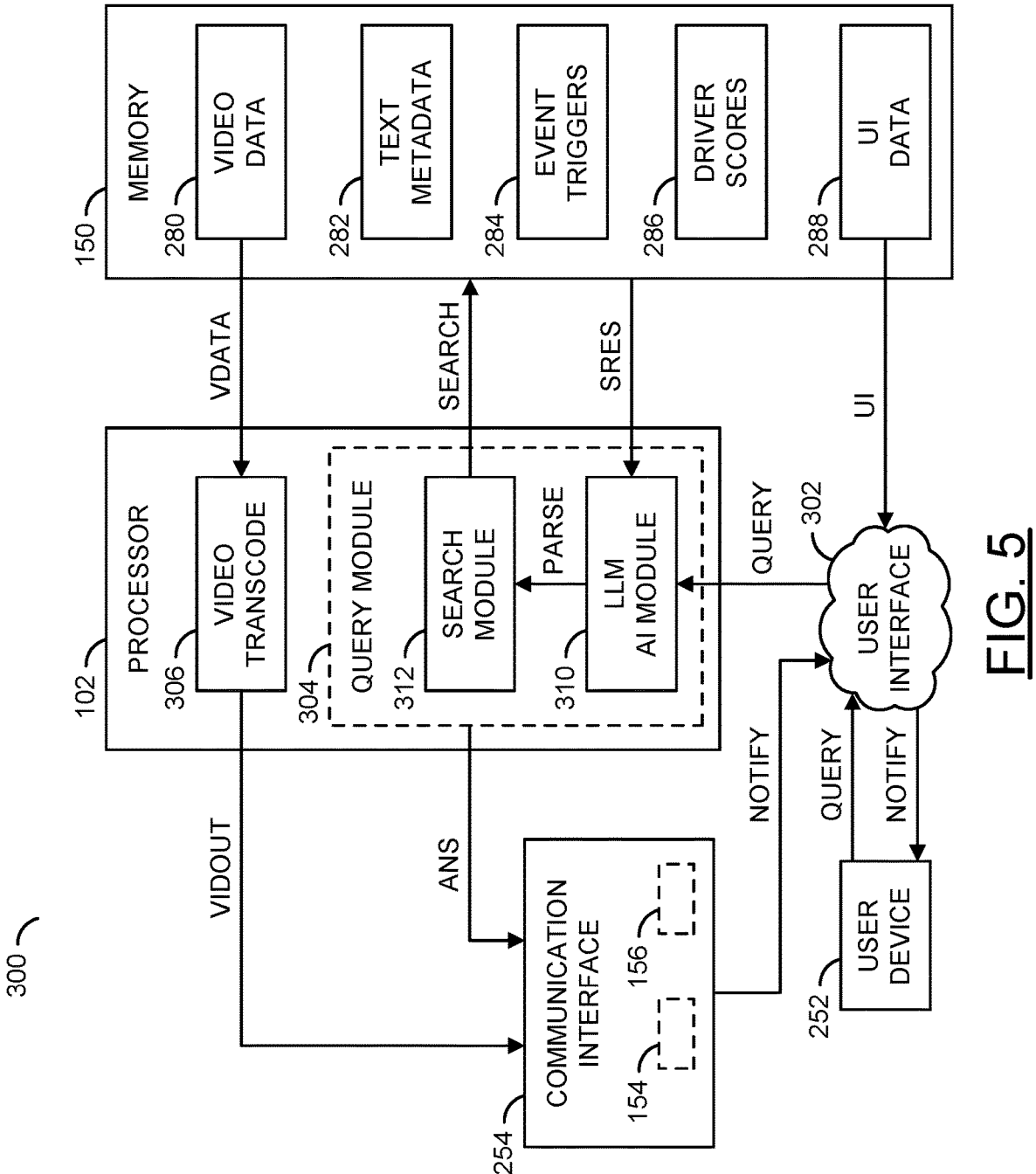
FIG. 5 is a block diagram illustrating analyzing a user input using an AI model implemented by a processor to perform a natural language search.

Referring to FIG. 5, a block diagram illustrating analyzing a user input using an AI model implemented by a processor to perform a natural language search is shown. An example implementation 300 is shown. The example implementation 300 may be a representative example of implementing AI models to perform a natural language trigger creation, a natural language search to provide video results for one of the edge devices 100a-100n and/or a natural language query. In some embodiments, the AI models may be implemented on the edge devices 100a-100n (e.g., without offloading computation to a cloud computing service). Whether the AI models may be implemented on the edge devices 100a-100n as shown in the example implementation 300 may depend on the processing capabilities of the processor 102, a power budget and/or a complexity of the AI models implemented.

The example implementation 300 may comprise the processor 102, the memory 150, the user device 252, the communication interface 254 and/or a block (or circuit) 302. The block 302 may implement a user interface. The example implementation 300 may comprise other components (not shown). The number, type and/or arrangement of the components of the example implementation 300 may be varied according to the design criteria of a particular implementation.

The user interface 302 may be displayed on the user device 252. In some embodiments, the user interface 302 may be provided in response to a local area connection with the communication interface 254. In some embodiments, the user interface 302 may be provided in response to a connection with a cloud computing service. In one example, the user interface 302 may be a web-based interface. In another example, the user interface 302 may be provided using a companion app for the edge devices 100a-100n. In yet another example, the user interface 302 may be implemented directly on the edge devices 100a-100n (e.g., the HID 166 may provide a touchscreen interface that may display the user interface 302).

The user interface 302 may receive a signal (e.g., UI), a signal (e.g., QUERY) and/or the signal NOTIFY. The user interface 302 may provide the signal NOTIFY and/or the signal QUERY. The user interface 302 may send/receive other signals. The number, type and/or data provided to/from the user interface 302 by each of the signals may be varied according to the design criteria of a particular implementation.

The signal UI may comprise the user interface information to enable the user interface 302 to be displayed on the user device 252. The signal UI may be generated based on the data stored in the UI data storage 288. The signal NOTIFY may comprise video output and/or the natural text description from the edge devices 100a-100n. The signal QUERY may comprise a plain text and/or natural language description of a trigger provided by the end user and/or search parameters provided by the end-user. The signal NOTIFY may comprise the results generated in response to the search parameters.

The end user may use the user interface 302 to input criteria for triggers and/or natural language search parameters (e.g., a signal QUERY). The processor 102 may enable the end user to input the criteria as a plain language description. For example, the end user may input a question and/or a request such as, "Show me all driving scores deductions for Bob today", "Which of my vehicles has the worst driving score?", "Find me which of my vehicles has driven in rain for more than 1 hour in the past 24 hrs", "How can I improve my driving?", etc., The input provided by the end user using the user device 252 may be presented from the user interface 302 to the processor 102 as the signal QUERY.

The processor 102 may comprise a block (or circuit) 304 and/or a block (or circuit) 306. The circuit 304 may implement a query module. The circuit 306 may implement a video transcode module. The processor 102 may comprise other components (not shown). The number, type and/or arrangement of the components of the processor 102 may be varied according to the design criteria of a particular implementation.

The query module 304 may be configured to receive the signal QUERY from the user interface 302 and/or a signal (e.g., SRES) from the memory 150. The rule module 304 may be configured to generate a signal (e.g., ANS) and/or a signal (e.g., SEARCH). The signal SRES may comprise a result of the query performed in response to a search. The signal SRES may be used by the query module 304 to generate the signal ANS. The signal ANS may comprise the natural text description. The natural text description in the signal ANS may comprise an answer generated by the rule module 304 in response to the query and/or request provided in the signal QUERY. In some embodiments, the end user may use the user interface 302 to input search parameters in the signal QUERY. The processor 102 may enable the end user to input the search parameters as a plain language question. For example, the end user may input a question and/or request such as "Which driver had the highest driving score this week?". The signal ANS may provide the response to the query by checking the driver scores 286. In another example, the question may comprise a request for a video, such as "Show me when Alice accelerated too quickly today". If there were no videos of Alice accelerating too quickly, then the query module 304 may respond with "Alice has not accelerated too quickly today" and no video results would be available. In another example, even when there are results for Alice driving quickly, in order to save bandwidth the signal ANS may be provided instead of video (e.g., the natural text response may comprise the answer, "yes, Alice accelerated quickly at 10 am and at 2:14 pm, would you like to see the video?). In another example, the natural text description in the signal ANS may be provided in addition to the video search results. For example, the natural text answer may provide a direct answer to the question, and the video search results may provide the supporting evidence (e.g., if Alice accelerated quickly twice, the response may be "yes, Alice accelerated too quickly twice, here are the two videos"). The type of natural text answer provided in the signal ANS may be varied according to the design criteria of a particular implementation. Details of the signal QUERY and the signal ANS may be described in U.S. patent application Ser. No. 18/210,931, filed on Jun. 16, 2023, appropriate portions of which are incorporated by reference.

The query module 304 may be configured to determine the criteria for a new trigger and/or determine which results to search for based on the query/request provided by the end user. In some embodiments, the query module 304 may implement an artificial intelligence model for natural text parsing, natural text generation and/or searching. In some embodiments, the query module 304 may implement a separate AI module from the AI module 270 described in association with FIG. 4. In some embodiments, an AI model implemented by the query module 304 may be implemented to determine the trigger to search for to add to the event triggers 284 and/or which driving scores to search for.

The query module 304 may comprise a block (or circuit) 310 and/or a block (or circuit) 312. The circuit 310 may implement a large language model (LLM) AI module. The circuit 312 may implement a search module 312. The query module 304 may comprise other components (not shown). The number, type and/or arrangement of the components of the rule module 304 may be varied according to the design criteria of a particular implementation.

The LLM AI module 310 may be configured to receive the question/request from the signal QUERY. The LLM AI module 310 may be configured to generate a signal (e.g., PARSE). The signal PARSE may be generated by the LLM AI module 310 in response to the signal PARSE. The LLM AI module 310 may present the signal PARSE to the search module 312.

The LLM AI module 310 may be configured to parse the user input from the signal QUERY. The LLM AI module 310 may enable the user input to comprise a plain language description of the trigger and/or the question. The LLM AI module 310 may be configured to perform natural language processing on the criteria/rule and/or question/request based on the pattern and/or relationship between the words provided. For example, the LLM AI module 310 may enable a user experience that provides a conversational interaction, where the processor 102 provides video results and/or notifications as answers in response to the input provided. In one example, the LLM AI module 310 may implement a ChatGPT AI model. In another example, the LLM AI module 310 may implement a Gemini AI model. The LLM AI module 310 may be configured to determine what the end user desires to receive notifications about and/or desires to find. The LLM AI module 310 may parse the user input to determine the criteria of the event trigger provided by the end user. In response to parsing the question/request, the LLM AI module 310 may generate the signal PARSE. The signal PARSE may comprise the search and/or trigger criteria determined from the natural language input. For example, the LLM AI module 310 may translate the natural language input into computer readable information without restricting the user input to particular keywords and/or input formats.

The LLM AI module 310 may be configured to analyze each word input in the signal QUERY individually and/or together based on the order, arrangement and/or context of the input provided. The parsed information generated may comprise more than merely a keyword. In one example, if the query provided comprises "Show me the last video where Bob ran a red light". The LLM AI module 310 may be configured to determine that the criteria is Bob traveling through a red light. Merely finding a video where Bob is the driver may be insufficient, and merely finding any video with a red light may be insufficient. The criteria may be interpreted together based on the relationship between the words and/or the word order to provide a notification only when the vehicle 50 driven by Bob travels through a red light. The LLM AI module 310 may further determine constraints based on the input. For example, the criteria asked for 'Bob is the driver' and 'ran a red light'. Based on the usage of 'ran the red light' the LLM AI module 310 may determine that the video frame(s) with Bob properly traveling through the red light (e.g., in a region that allows right turn on red) does not meet the criteria. In another example, the LLM AI module 310 may determine time constraints for the query from the natural language user input. For example, for an input that requests "Find me all deductions from today" the LLM AI module 310 may determine from the use of the word 'today' that the search may be constrained to the last 24 hours (or the start of the work day). The method of parsing and/or interpreting the meaning behind the criteria provided may be varied according to the design criteria of a particular implementation. Details of the LLM AI module 310 may be described in U.S. patent application Ser. No. 18/210,931, filed on Jun. 16, 2023, appropriate portions of which are incorporated by reference.

The search module 312 may be configured to receive the search criteria from the signal PARSE. The search module 312 may be configured to generate a signal (e.g., SEARCH). The signal SEARCH may comprise the information to look up data in the driver scores 286. In some embodiments, another signal (not shown) may be generated when the signal PARSE corresponds to a new trigger to add to the event triggers 284. The search module 312 may present the signal SEARCH to the memory 150. In some embodiments, the search module 312 may be part of the LLM AI module 310 (e.g., implemented as a single component in the query module 304).

The search module 312 may be configured to compare the information generated by the LLM AI module 310 in the signal PARSE with the text metadata 282 and/or the driver scores 286. The search module 312 may be configured to find results that have the smart metadata that corresponds with the request provided by the end user. The request provided may not necessarily have to fully match the text metadata 282 and/or the driver scores 286. For example, the request may be fed into the LLM AI module 310 to determine if the input corresponds to one of the drivers/vehicles in the driving score 286. In some embodiments, the signal ANS may indicate that no item matching the request provided by the end user has been found. If no matching item has been found in the text metadata 282 and/or the driver scores 286, the signal ANS may still be created for a close response (e.g., a match for speeding may be found for Bob but not for Alice). The method of matching and/or determining whether the request corresponds to the drivers/vehicles in the text metadata 282 and/or the driver scores 286 may be varied according to the design criteria of a particular implementation.

The query module 304 may be configured to select the video output from the stored video data 280 and/or generate the natural text answer ANS. For example, the timestamp associated with the smart metadata stored in the text metadata 282 may be matched with the timestamps of the video frames in the video data storage 280. The video data that matches the timestamps may be presented as output. The LLM AI module 310 may receive the signal SRES from the memory 150. For example, the signal SRES may be received from the driver scores 286 comprising the results from the search/query. The LLM AI module 310 may be configured to convert the search results from the signal SRES into a natural language answer to the query. For example, the LLM AI module 310 may use the input from the signal QUERY and the search results from the signal SRES to generate a context appropriate and accurate natural language response. The natural language response generated by the LLM AI module 310 may be presented as the signal ANS.

The video transcode module 306 may be configured to receive the signal VDATA. The video transcode module 306 may be configured to generate the signal VIDOUT. The signal VIDOUT may be generated by the video transcode module 306 in response to the signal VDATA. The video transcode module 306 may present the signal VIDOUT to the communication interface 254. In some embodiments, the signal VDATA may be generated for the signal NOTIFY. For example, part of the notification communicated to the user device 252 may comprise a video of the event detected that meets the criteria of the notification rule. Video data may not necessarily be communicated. For example, the query may comprise a request for the video (e.g., "send me a video of anyone that hit another vehicle").

The video transcode module 306 may be configured to prepare the video frames selected as part of the results to the query communicated to the user device 252. In one example, the video transcode module 306 may be configured to packetize the video results to be communicated by the communication interface 254. In some embodiments, the video transcode module 306 may be configured to transcode and/or encode the video frames into a particular format. Transcoding and/or encoding the video frames may reduce an amount of bandwidth used to communicate the signal VIDOUT. The transcoding and/or encoding of the video frames may enable the video results to be in an appropriate format to be viewed on the user device 252 (e.g., using an encoding format that may be decoded by the user device 252, using a resolution that is supported by the display of the user device 252, using a framerate that is supported by the user device 252, etc.).

The signal VIDOUT may be presented to the communication interface 254. In some embodiments, the signal VIDOUT and the signal ANS may be received by the communication interface 254. The communication interface 254 may generate the signal NOTIFY in response to the signal VIDOUT and/or the signal ANS. In some embodiments, the signal NOTIFY may comprise the transcoded video frames and/or the smart metadata describing the video data. In one example, the signal NOTIFY may comprise the video frames only. In another example, the signal NOTIFY may comprise the smart metadata describing the video frames only (e.g., to conserve bandwidth). In another example, the signal NOTIFY may comprise the video frames and the smart metadata to enable the smart metadata to be used as an answer to the query/request of the end user. The format of the signal NOTIFY may be varied according to the design criteria of a particular implementation.

The signal NOTIFY may be presented by the communication interface 254 to the user interface 302. The user interface 302 may display and/or output the video results and/or the natural text answer/description from the signal NOTIFY on the user device 252 as the signal NOTIFY. The signal NOTIFY may provide the video frames requested based on the end-user input from the signal QUERY. The signal NOTIFY may provide the natural text answer to the query/request based on the end-user input from the signal QUERY.

In some embodiments, the processor 102 may implement four different AI models. In an example, the CNN module 190b (e.g., implemented by the video processing pipeline 260 and/or the detection module 262) may be one distinct AI model (e.g., a CNN) implemented to detect objects and/or behavior. In another example, the video-to-text AI module 272 may be one distinct AI model (e.g., a LLM) implemented to describe the visual content of the video frames and/or generate the smart metadata. In yet another example, the driving score AI module 274 may be one distinct AI model (e.g., a CNN and/or a LLM) implemented to determine whether the video content matches the triggers and/or determine when to generate notifications. In still another example, the query module 304 (or the LLM AI module 310) may be one distinct AI model (e.g., a LLM) implemented to understand the criteria for the triggers and/or an answer to a query presented by the user. In some embodiments, all four of the AI models may be implemented locally by the processor 102. In some embodiments, the processor 102 may locally implement some of the AI models and other AI models may be off-loaded to cloud services. The number and/or types of AI models implemented to implement each feature may be varied according to the design criteria of a particular implementation.

Figure 6:
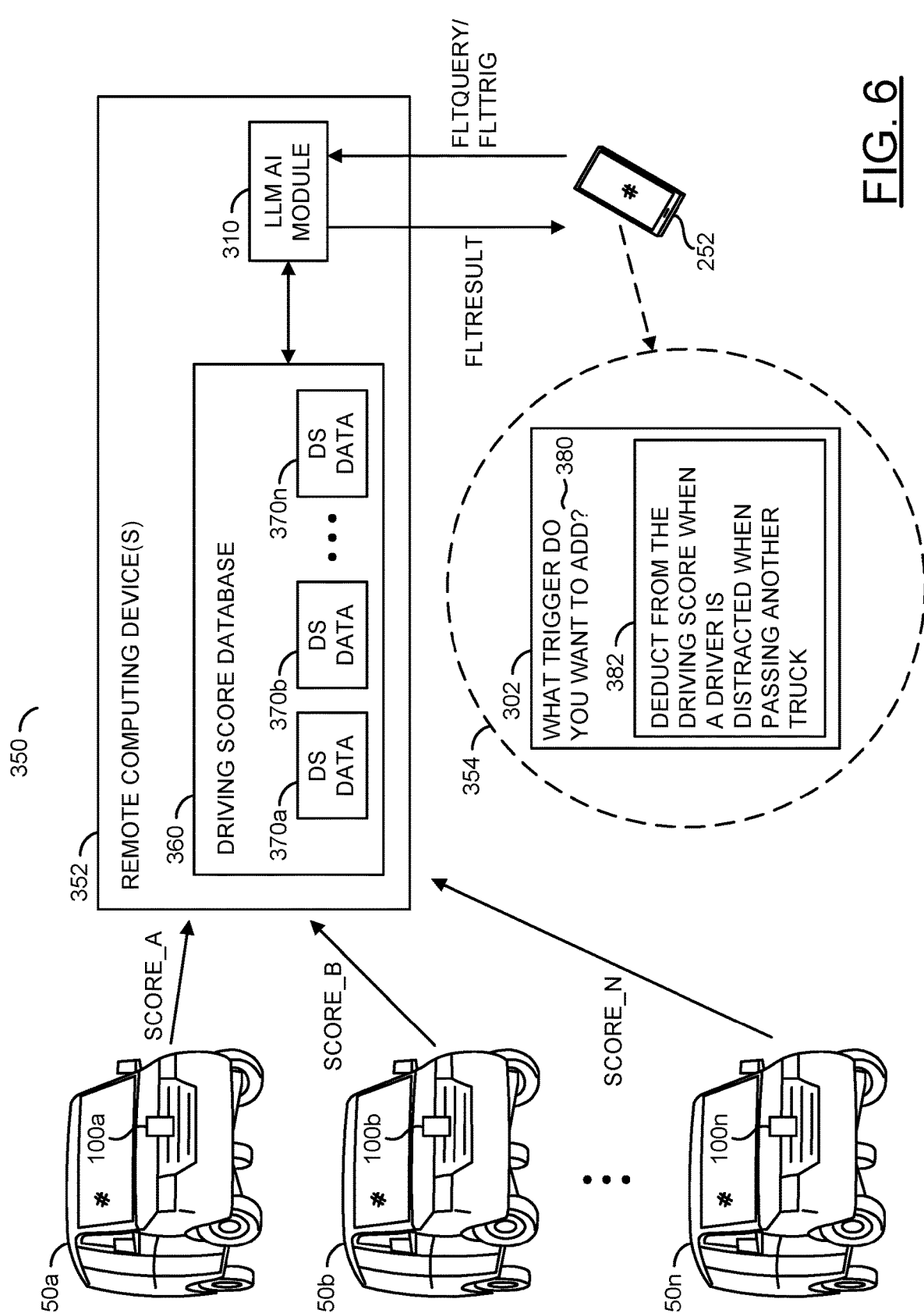
FIG. 6 is a diagram illustrating driver scores being analyzed for a fleet of vehicles.

Referring to FIG. 6, a diagram illustrating driver scores being analyzed for a fleet of vehicles is shown. A system 350 is shown. The system 350 may comprise vehicles 50a-50n, the camera systems 100a-100n, the user device 252 and/or a block (or circuit) 352. The block 352 may comprise a remote computing device and/or a scalable computing service. The system 350 may comprise other components (not shown). A sample interface 354 is also shown in the system 350. The number, type and/or arrangement of the components of the system 350 may be varied according to the design criteria of a particular implementation.

The vehicles 50a-50n may represent a fleet of vehicles (e.g., a fleet of vehicles managed by a person and/or a business). Each of the vehicles 50a-50n are shown implementing a respective one of the camera systems 100a-100n. A single implementation of the respective camera systems 100a-100n are shown for each of the vehicles 50a-50n as a representative example. Generally, each of the vehicles 50a-50n for the fleet of vehicles may comprise a number of the camera systems 100a-100n as shown in association with FIG. 1.

In the system 350, the camera systems 100a-100n may provide a respective signal (e.g., SCORE_A-SCORE_N) to the scalable computing device 352. The signals SCORE_A-SCORE_N may represent the signal SCORE (or NOTIFY) generated by the camera system 100 shown in association with FIG. 4. For example, each of the camera systems 100a-100n and/or the vehicles 50a-50n may provide a respective driving score and/or video data to the remote computing device 352.

In the example shown, the driving scores may be uploaded to the scalable computing device 352. In some embodiments, the processor 102 may not have the processing capability and/or the power budget to implement the video-to-text AI module 272, the driving score AI module 274 and/or the LLM AI module 310. Instead of generating the smart metadata locally and/or parsing the requests locally, the camera system 100 may offload the processing to the scalable computing service 352. Generally, the AI models implemented to perform the video-to-text and/or the language parsing may be computationally heavy. When the local processing capabilities of the edge devices 100a-100n are insufficient, the video data and/or the query may be sent to the scalable computing services 352. Details of implementing the various AI modules in the cloud (e.g., on scalable computing services) may be described in association with U.S. application Ser. No. 18/210,931, file don Jun. 16, 2023, appropriate portions of which are incorporated by reference.

The scalable computing service 352 may be configured to store data, retrieve and transmit stored data, process data and/or communicate with other devices (e.g., the camera system 100, the user device 252, etc.). The scalable computing service 352 may be implemented as part of a cloud computing platform (e.g., distributed computing). In an example, the scalable computing service 352 may be implemented as a group of cloud-based, scalable server computers. By implementing a number of scalable servers, additional resources (e.g., power, processing capability, memory, etc.) may be available to process and/or store variable amounts of data. For example, the scalable computing service 352 may be configured to scale (e.g., provision resources) based on demand. The scalable computing services 352 may implement scalable computing (e.g., cloud computing). The scalable computing may be available as a service to allow access to processing and/or storage resources without having to build infrastructure (e.g., the provider of the camera systems 100a-100n may not have to build the infrastructure of the scalable computing service).

The scalable computing service 352 may comprise the LLM AI module 310 and/or block (or circuit) 360. The block 360 may comprise a driving score database. The scalable computing service 352 may further comprise memory, processor(s) and/or communication hardware. The driving score database 360 may comprise block (or circuits) 370a-370n. The blocks 370a-370n may comprise driving score data. The scalable computing service 352 may comprise other components (not shown). The number, type and/or arrangement of the components of the scalable computing service 352 may be varied according to the design criteria of a particular implementation.

The LLM AI module 310 may have a similar implementation as the LLM AI module 310 described in association with FIG. 5. In some embodiments, the LLM AI module 310 (or the query module 304) may be implemented at the remote computing device 352 instead of the by the processor 102 (e.g., the camera systems 100a-100n may upload data to the cloud computing services to off-load computations to the cloud instead of performing computational heavy processing locally). In some embodiments, the LLM AI module 310 (or the query module 304) may be implemented both at the remote computing device 352 and by the processor 102 (e.g., the LLM AI module 310 may have similar functionality locally and in the cloud).

The driving score database 360 may receive the signals SCORE_A-SCORE_N. The driving scores provided by the signals SCORE_A-SCORE_N may be stored in the driving score data 370a-370n. In one example, the driving score data 370a-370n may comprise driving score data for each individual driver. In another example, the driving score data 370a-370n may comprise driving score data for each of the vehicles 50a-50n. The driving score data 370a-370n may enable granular data about the driving behavior of the drivers and/or the vehicles 50a-50n in a vehicle fleet to be stored in a centralized and/or distributed database. Implementing the driving score database 360 may enable a person and/or a fleet manager to have access to the driving score data of multiple drivers and/or multiple vehicles.

In the example shown, the user device 252 may be used by a fleet manager. The fleet manager may manage, own and/or be responsible for the vehicles 50a-50n. For example, the fleet manager may own a shipping business, a taxi service, a repair service, etc. that comprises the fleet of vehicles 50a-50n. In another example, the fleet manager may be a parent that owns multiple vehicles used by other family members that may be the fleet of vehicles 50a-50n. The user device 252 may communicate a signal (e.g., FLTQUERY/FLTTRIG) and/or a signal (e.g., FLTRESULT) to the scalable computing device 352. The signal FLTQUERY may operate similarly to the signal QUERY. One difference may be that the signal FLTQUERY may provide data for the LLM AI module 310 to access the driving score database 360 to enable a query about the driving score data 370a-370n for the entire vehicle fleet 50a-50n. The signal FLTRESULT may operate similarly to the signal NOTIFY. One difference may be that the signal FLTRESULT may be generated by the LLM AI module 310 (or the query module 304) to provide an answer to the request in response to searching the driving score data 370a-370n for the entire vehicle fleet 50a-50n in the driving score database 360.

The signal FLTQUERY may enable querying the entire fleet of vehicles 50a-50n using the driving score database 360. In one example, the fleet manager may submit the signal FLTQUERY with a request for "show me the driver with the highest and the lowest driving score", then the LLM module 310 may parse the request and search the driving scores 370a-370n and provide the signal FLTRESULT comprising the answer with the highest and lowest scores (e.g., "Alice has the highest driving score of 99 and Bob has the lowest driving score of 36"). In another example, the fleet manager may submit the signal FLTQUERY with a request for "find me which of my vehicles has driven in rain for more than 1 hour in the past 24 hrs", then the LLM AI module 310 may parse the request and the provide the signal FLTRESULT comprising the answer (e.g., "vehicle X and Y have been driving in the rain for more than 1 hour"). In yet another example, the fleet manager may submit the signal FLTQUERY with a request for "Bob is late, what happened?" and the AI module 310 may parse the request and provide the signal FLTRESULT comprising the answer (e.g., "Bob is safe, but he is stuck in traffic"). The type of query across the entire vehicle fleet 50a-50n and/or the response provided may be varied according to the design criteria of a particular implementation.

The signal FLTTRIG may enable the fleet manager to generate a new trigger to add to the event triggers 284. In an example, the fleet triggers added using the signal FLTTRIG may enable detecting the new trigger for each of the camera systems 100a-100n implemented by the fleet of vehicles 50a-50n. The sample interface 354 is shown for the user device 252. The sample interface 354 may comprise the user interface 302 (e.g., generated in response to the signal UI). The user interface 302 may comprise a trigger prompt 380 and a trigger input 382. The trigger prompt 380 may indicate to the fleet manager that a new trigger may be added. In the example shown, the trigger prompt 380 may comprise, "What trigger do you want to add?". The trigger input 382 may comprise natural text input provided by the end user (e.g., the fleet manager). The trigger input 382 may be used to provide instructions and/or criteria for the new trigger. In the example shown, the trigger input 382 may comprise, "Deduct from the driving score when a driver is distracted when passing another truck".

In response to the end-user submitting the trigger input 382, the user device 252 may communicate the signal FLTTRIG to the remote computing device 352. The LLM AI module 310 may parse the natural language input in the signal FLTTRIG. The LLM AI module 310 may be configured to generate the trigger from the data in the signal FLTTRIG in a format that may be stored in the event triggers 284 (e.g., to be usable by the driving score AI module 274) and/or the determine an adjustment to the driving score to store in the driver scores 286. For example, the LLM AI module 310 may convert the plain language criteria into a sequence of information (e.g., extract the various information from the natural language input) and convert the sequence of information into a format compatible with the event triggers 284 and/or the driver scores 286. The remote computing device 352 may send an update signal to each of the camera systems 100a-100n implemented by the fleet of vehicles 50a-50n to update the event triggers 284 and/or the driver scores 286 throughout the fleet of vehicles 50a-50n.

Figure 7:
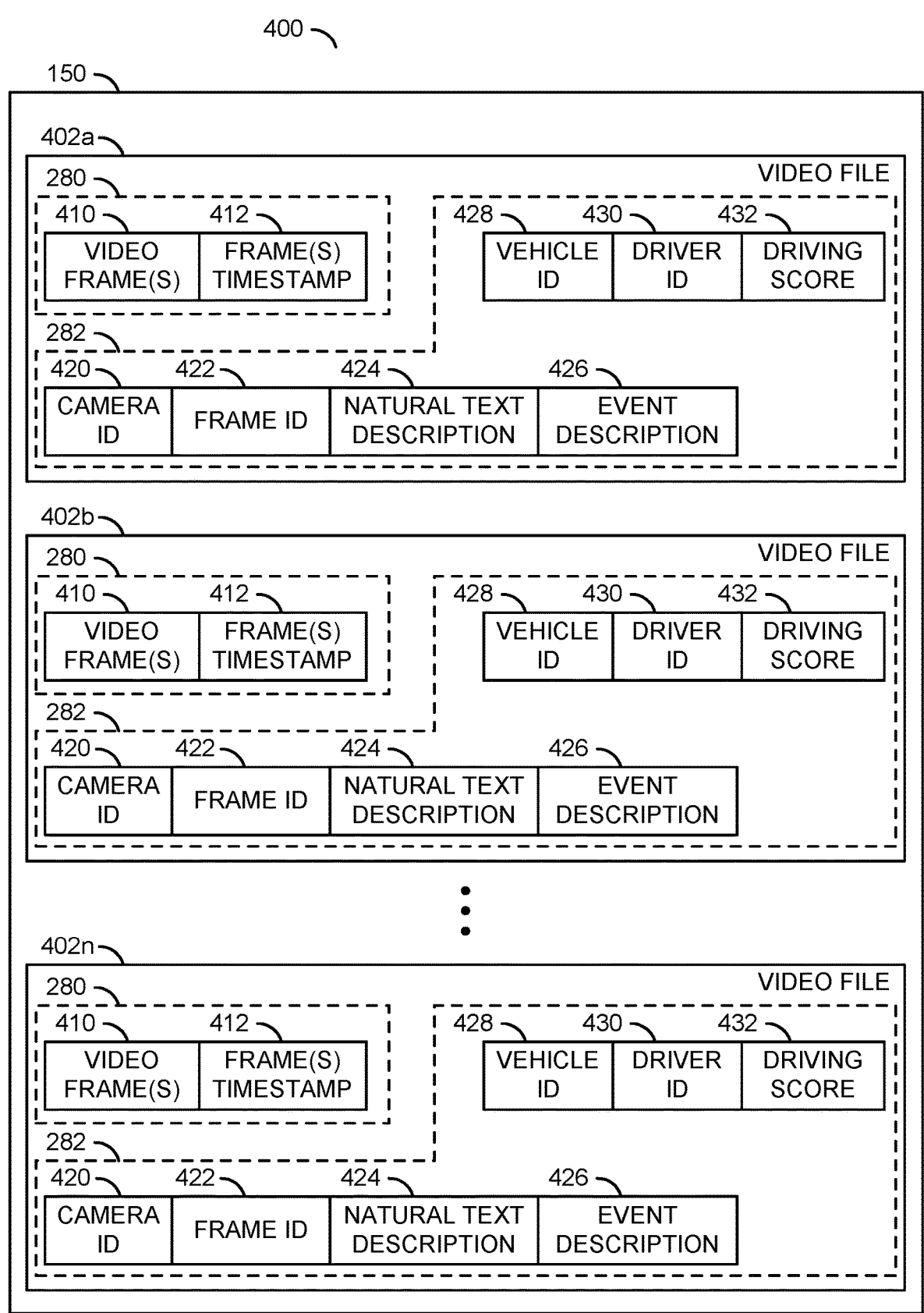
FIG. 7 is a diagram illustrating smart metadata stored with video data in a memory.

Referring to FIG. 7, a diagram illustrating smart metadata stored with video data in a memory is shown. An example memory layout 400 for the memory 150 is shown. The memory layout 400 may be one example arrangement of data stored in the memory 150. The memory layout 400 may enable associating the smart metadata with the stored video frames. The memory layout 400 may enable the processor 102 to search the smart metadata for the video frames that correspond with particular drivers in the vehicle fleet 50a-50n. The memory layout 400 is shown in a portion of the memory 150. The memory 150 may comprise other data. The layout and/or types of data stored in the memory 150 may be varied according to the design criteria of a particular implementation.

The memory layout 400 may comprise a number of blocks (or circuits) 402a-402n. The blocks 402a-402n may comprise video files (or video clips). Each of the video files 402a-402n may comprise at least one of the video frames from the signal VDATA. In some embodiments, each of the video files 402a-402n may correspond to a single video frame. In some embodiments, each of the video files 402a-402n may comprise a sequence of video frames (e.g., a ten second long video clip, a thirty second long video clip, a video clip that has a variable length depending on how long a particular event/object is detected in the field of view, etc.). In some embodiments, each of the video files 402a-402n may have the same length. In some embodiments, the each of the video files 402a-402n may have different lengths. The number of the video files 402a-402n stored and/or the length of the video files 402a-402n stored may be varied according to the design criteria of a particular implementation.

Each of the video files 402a-402n may comprise the video data 280 and/or the text metadata 282. Generally, each of the video files 402a-402n may comprise at least the video data 280. In some embodiments, the video files 402a-402n may further comprise the text metadata 282 if the video data 280 has been selected by the detection module 262 and/or the extraction module 264 for the particular video frames stored.

The video data 280 for each of the video files 402a-402n may comprise a block (or circuit) 410 and/or a block (or circuit) 412. The block 410 may comprise video frame(s). The video frame(s) 410 may comprise one or more of the video frames in the signal VDATA. The number of the video frames stored as the video frame(s) 410 may depend on the length of the video files 402a-402n. The block 412 may comprise a frame(s) timestamp. The frame(s) timestamp 412 may comprise a timestamp, a time range, a frame ID and/or a range of frame IDs. The frame(s) timestamp 412 may provide an identifier for the video frame(s) 410. The frame (s) timestamp 412 may enable the processor 102 to determine the sequence of the video files 452a-452n. The frame (s) timestamp 412 may enable matching the video data 280 with the corresponding text metadata 282. The video data 280 may further comprise keyword metadata (not shown). In an example, the keyword metadata may be generated by the video processing pipeline 260, the detection module 260 and/or the CNN module 190b. The keyword metadata may be separate metadata from the smart metadata in the text description 282. The smart metadata may be provided by the video-to-text AI module 272 in addition to any keyword metadata that may be generated for the video frame(s) 410. The video frame(s) 410 and/or the frame(s) timestamp 412 may be generated by the video processing pipeline 260 while processing the pixel data arranged as video frames.

The text metadata 282 for each of the video files 402a-402n may comprise blocks (or circuits) 420-432. The block 420 may comprise camera ID data. The block 422 may comprise frame ID data. The block 424 may comprise a natural text description. The block 426 may comprise an event description. The block 428 may comprise a vehicle ID. The block 430 may comprise a driver ID. The block 432 may comprise a driving score. The text metadata may comprise other types of smart metadata (not shown). The number and/or type of data stored for the smart metadata of the text metadata 282 may be varied according to the design criteria of a particular implementation.

The text metadata 282 may be generated by the video-to-text AI module 272. The camera ID 420 may enable the source of the video frame(s) 410 to be determined. The frame ID data 422 may enable the processor 102 and/or the search module 312 to correlate the natural text description 424 and/or the event description 426 with the video frame(s) 410. The frame ID data 422 may be stored in the same format as the frame(s) timestamp 412. For example, if the frame(s) timestamp 412 comprises data in a time format (e.g., timestamps), then the text metadata 282 may comprise a timestamp range. In another example, if the frame(s) timestamp 412 comprises data in a frame number format, then the text metadata 282 may comprise the video frame numbers.

The natural text description 424 may comprise a plain language description of the contents of the video frame(s) 410. For example, the natural text description 424 may describe everything in the video frame analyzed by the video-to-text AI module 272 (e.g., people in the video frame, the relationship between objects in the video frame, the behavior of each object in the video frame, a description of each object in the video frame, a location of each object in the video frame, a color of the objects, a size of the objects, a time of time, a description of the environment, a description of the weather, etc.). The event description 426 may comprise a description of any of the triggers detected in the video frame 410. For example, the natural text description 424 may fully describe the contents of the video frame(s) 424, which may include data that may be irrelevant and/or superfluous in order to describe the video frame, the event description 426 may comprise a narrower description of any of the even triggers detected. For example, the driving score AI module 274 may add the event description 426 to the text metadata 282. The event description 426 may enable a faster lookup in response to a query (e.g., less amount of data in the event description 426 may enable a quick search for a particular event/trigger compared to the large amount of text data in the natural text description 424). The natural text description 424 and/or the event description 426 may comprise the smart metadata describing the contents of the associated video frame(s) 410.

The vehicle ID 428 may comprise an identifier for the vehicle 50 and/or a particular vehicle of the fleet of vehicles 50a-50n. For example, the vehicle ID 428 may distinguish between the vehicles 50a-50n, while the camera ID 420 may distinguish between each of the camera systems 100a-100n implemented on each of the vehicles 50a-50n. The driver ID 430 may comprise an identity of the driver 60. In an example, the driver ID 430 may be determined in response to computer vision operations (e.g., facial detection) performed on video frames captured in the field-of-view 62e. In another example, the driver ID 430 may be determined through other types of sensors (e.g., an RFID reader implemented as one of the sensors 164 that may scan an employee card of the driver 60). The vehicle ID 428 and the driver ID 430 may provide data for distinguishing between the driving score data 370a-370n in the driving score database 360. For example, the vehicle ID 428 may enable a driving score to be determined for a particular one of the vehicles 50a-50n. In another example, the driver ID 430 may enable a driving score to be determined for a particular driver 60.

The driving score 432 may comprise data about the driving score for the vehicle and/or the driver. In an example, the driving score AI module 274 may add the driving score 432 to the smart metadata 282. In an example, in response to the driving score AI module 274 detecting a trigger from the event triggers 284, the driving score 432 may be added to the smart metadata 282. For example, the driver 60 may have a low overall driving score in the driving score data 270a-270n and may wish to determine what caused the low driving score. The driver 60 may provide a query of "what caused my driving score to drop the most". The text metadata 282 may be searched for the driver ID 430 that corresponds to the driver 60 and the driving score 432 may be compared for each of the video data 402a-402n that has the corresponding driver ID 430 to find the largest driving score deduction. The signal ANS may be provided that explains the largest deduction (e.g., "you were involved in a car accident") and/or the video frames 410 that correspond to the largest deduction may be provided.

The video files 402a-402n may be communicated upon request. In some embodiments, the query module 304 and/or the search module 312 may select the video files 402a-402n (comprising the video frame(s) 410, the natural text description 424, the event description 426 and/or the driving score 432) to provide as part of the signal VIDOUT and/or the signal ANS in response to a query/request from an end user search. In some embodiments, the video files 402a-402n may be communicated as part of the signal NOTIFY. In some embodiments, the video frame(s) 410 may not be communicated with a search result and/or the notification. For example, to conserve bandwidth, the natural text description 424 and/or the event description 426 may be communicated to the user device 252 without the video frames 410 to enable the end user to determine what has occurred in the selected video files 402a-402n without using bandwidth for communicating the video frame(s) 410. The combinations of data communicated to the end user may be varied according to the design criteria of a particular implementation.

Figure 8:
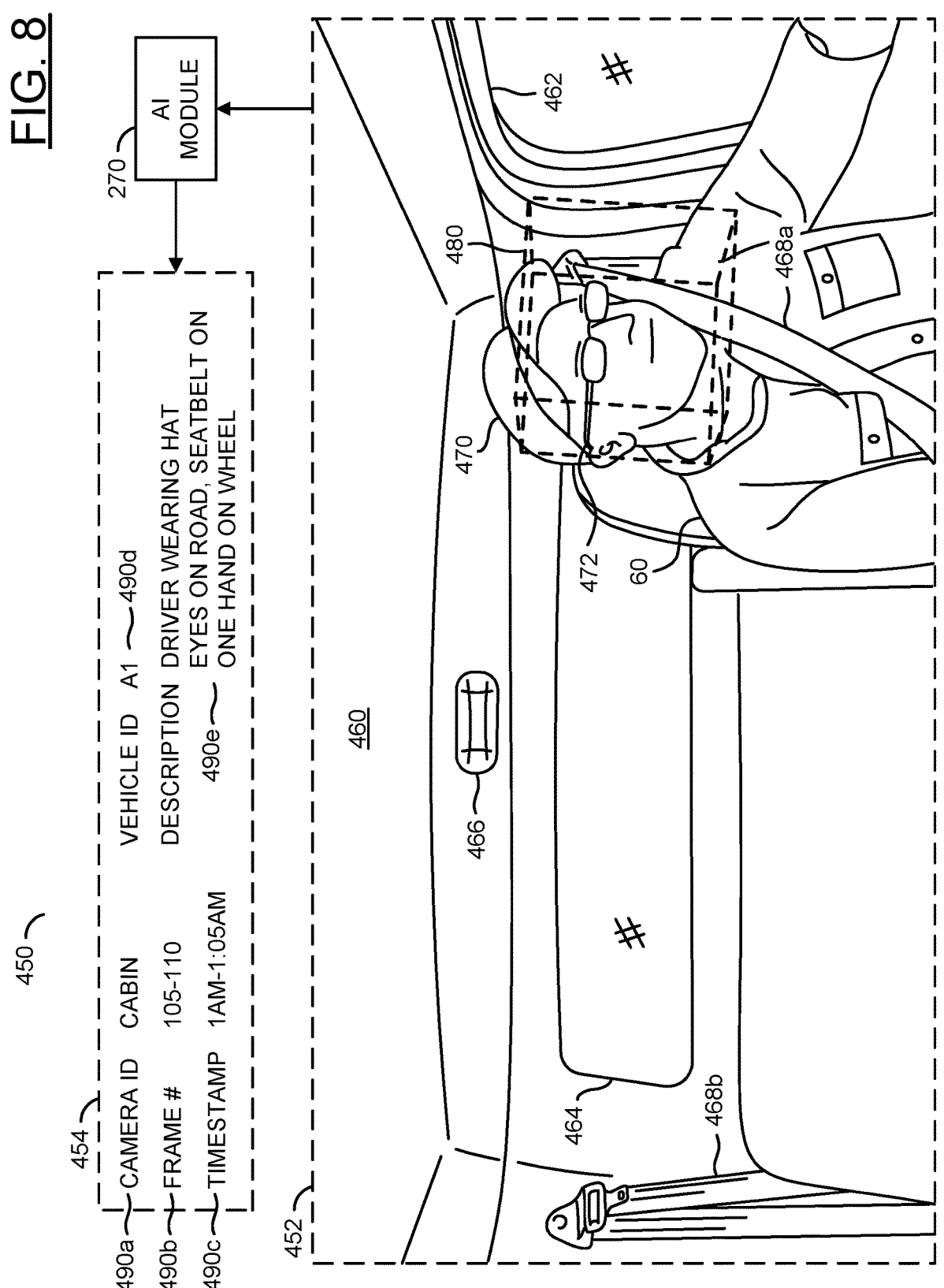
FIG. 8 is a diagram illustrating an analysis of a video frame to generate smart metadata.

Referring to FIG. 8, a diagram illustrating an analysis of a video frame to generate smart metadata is shown. An example video-to-text analysis 450 of a video frame is shown. The video-to-text analysis 450 may comprise the AI module 270, an example video frame 452 and/or an example of a smart metadata entry 454. Generally, the video frame 452 may be part of the video data 280 stored in the memory 150 (e.g., before analysis by the video-to-text AI module 270, simultaneously with the analysis by the video-to-text AI module 272 or after analysis by the video-to-text AI module 272). The smart metadata entry 454 may be generated by the AI module 270 in response to an analysis of the video frame 452. A text description of the video frame 452 (e.g., part of the smart metadata entry 454) may be stored in the text metadata storage 282. The video-to-text analysis of the video frame 452 may be performed by the video-to-text AI module 272 locally by the processor 102 and/or offloaded to the scalable computing service 352.

The video frame 452 may be a representative example of the video data generated by the video processing pipeline 260 for analysis by the video-to-text AI module 272. In one example, the video frame 452 may represent the video frames provided in the signal VDATA. In another example, the video frame 452 may represent a subset of the video frames in the signal EFRM exacted by the video extraction module 264. The video frame 452 may be provided as input to the video-to-text AI module 272 for analysis. The video-to-text AI module 272 may generate the smart metadata entries in response to the analysis of the video frame 452. The video frame 452 may be stored as the video frame(s) 410 as part of the video files 402a-402n in the memory 150.

The video data (or visual content) of the video frame 452 is shown as a representative example of video data captured from the camera system 100e of the driver 60. While the video frame 452 is shown as human viewable visual content for illustrative purposes, the video-to-text AI module 272 may perform various operations on the pixel data and/or image blocks of the video frame 452. The video data of the video frame 452 may comprise the driver 60, a vehicle interior 460, a driver side window 462, a rear window 464, a cabin light 466, seatbelts 468a-468b, a hat 470 and/or glasses 472 captured in the field of view 62e. The driver 60 is shown looking forward (e.g., through a windshield) wearing the seatbelt 468a, the hat 470 and the glasses 472. The passenger seat is shown empty.

A dotted shape 480 is shown in the video frame 452. The dotted shape 480 may represent the detection of an object/subject by the computer vision operations performed by the processor 102, the video-to-text AI module 272 and/or the driving score AI module 274. The dotted shape 480 may comprise the pixel data corresponding to an object detected by the computer vision operations pipeline, the neural network model 190b, the video-to-text AI module 272 and/or the driving score AI module 274. In the example shown, dotted shape 480 may correspond to the face of the driver 60. In some embodiments, the objects may be detected in response to animal detection, household object detection, interior object detection, person detection, vehicle detection, roadway detection, sky region detection, obstacle detection and/or exterior object detection (e.g., one or more of the neural network 190b, the video-to-text AI module 272 and/or the driving score AI module 274 may comprise libraries configured to detect people, vehicles, objects, animals, etc.). The dotted shape 480 is shown for illustrative purposes. In an example, the dotted shape 480 may be a visual representation of the object detection (e.g., the dotted shape 480 may not appear on an output video frame in the signal VIDOUT). In another example, the dotted shape 480 may be a bounding box generated by the processor 102 displayed on the output video frames to indicate that an object has been detected (e.g., the bounding box 480 may be displayed in a debug mode of operation).

The computer vision operations, the driving score analysis and/or the video-to-text operations may be configured to detect characteristics of the detected objects, behavior of the objects detected, a movement direction of the objects detected, a context of the objects detected and/or a liveness of the objects detected. The characteristics of the objects may comprise a height, length, width, slope, an arc length, a color, a color temperature, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object may comprise a distance measurement from the lens 160 to the detected object. The behavior and/or liveness may be determined in response to the type of object and/or the characteristics of the objects detected. While one example video frame 452 is shown, the behavior, movement direction and/or liveness of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding box 480 may be a region of interest of a face of the driver 60. The bounding box 480 is shown as a representative example of one object but, generally, many more objects may be detected (e.g., the hat 470, the glasses 472, the seatbelts 468a-468b, etc.). In an example, the settings (e.g., the feature set) for the processor 102 (e.g., the computer vision AI neural network model implemented by the CNN module 190b, the video-to-text AI module 272 and/or the driving score AI module 274) may define objects of interest to be pets, people, storage objects, sporting equipment, tools, supplies, etc., For example, doorways, windows, ceilings, and/or stairs may not be objects of interest for a feature set defined to detect objects stored in or near a vehicle. In the example shown, the bounding box 480 is shown having a cubic (or rectangular) shape. In some embodiments, the shape of the bounding box 480 that correspond to the objects of interest detected may be formed to follow the shape of the body of the people detected and/or the shape of the furniture detected (e.g., an irregular shape that follows the curves and/or the body shape of the detected objects).

The processor 102, the CNN module 190b, the video-to-text AI module 272 and/or the driving score AI module 274 may be configured to implement region, animal, object and/or face detection techniques. In some embodiments, other types of subjects as objects of interest may be detected (e.g., vehicles, passengers, pedestrians, street signs, etc.). The computer vision techniques and/or the video-to-text techniques may be configured to detect the regions of interest (ROIs) of the detected object 480 and/or generate the information about the detected object 480 and/or the context of the scene generally. For example, the bounding box 480 may be a visual representation of the ROIs detected. The computer vision technique may be looped (e.g., to iteratively perform object/subject detection throughout the example video frame 452) in order to determine if any objects of interest (e.g., as defined by the feature set) are within the field of view 62e of the lens 160 and/or the image sensor 180.

While only the object 480 is shown as an object of interest, the computer vision operations and/or the video-to-text operations performed by the processor 102, the CNN module 190b, the video-to-text AI module 272 and/or the driving score AI module 274 may be configured to detect background objects and/or other types of objects. The background objects may be detected for other computer vision purposes (e.g., training data, labeling, depth detection, etc.). The type(s) of subjects identified as the objects of interest 480 may be varied according to the design criteria of a particular implementation.

The video-to-text AI module 272 may analyze the video frame 452 to generate the smart metadata that may describe the contents of the video data. The driving score AI module 274 may analyze the video frame 452 to determine whether any triggers have been detected (e.g., to generate a notification and/or adjust the driver scores 286). In some embodiments, the driving score analysis may be performed in parallel with the video-to-text analysis. In some embodiments, the driving score analysis may be performed after the video-to-text analysis on the natural text description 424 generated about the video frame 452.

The video-to-text AI module 272 may be configured to generate the smart metadata entry 454 for the video frame 452. In some embodiments, analysis performed by the driving score AI module 274 may provide additional data for the smart metadata entry 454. The smart metadata entry 454 is shown as a representative example of the text metadata 282 generated for the video files 402a-402n. While a single example of the smart metadata entry 454 is shown for the video frame 452, generally, the text metadata 282 may be generated for each of the video frames 410 and/or a group (or sequence) of video frames.

The smart metadata entries may be generated by the video-to-text AI module 272. The smart metadata entries may correspond to each of the video frames. For example, the video-to-text AI module 272 may generate one smart metadata entry for the video frame 452 and other smart metadata entries for each one of the video frames captured. The smart metadata that describes the contents of the video frames may be stored in the text metadata 282. In some embodiments, the driving score AI module 274 may analyze the text metadata 282 to compare with the event triggers 284 instead of analyzing the video data 280 directly.

The smart metadata entry 454 may comprise metadata 490a-490e. The metadata 490a-490e may comprise an illustrative version of the data generated for the smart metadata entry 454. Generally, more data and/or data comprising granular details may be stored as the metadata 490a-490e. The metadata 490a-490e may comprise a camera ID 490a, a frame number 490b, a timestamp 490c, a vehicle ID 490d and/or a description 490e. For example, the description 490e is shown with a relatively small amount of text for illustrative purposes, while the actual text description generated by the video-to-text AI module 272 may comprise a detailed description of the video content.

The camera ID 490a may identify the particular camera that captured the video frame 452. In the example shown, the camera ID 490a may be a cabin camera (e.g., corresponding to the camera system 100e shown in association with FIG. 1). The camera ID 490a may correspond to the camera ID 420 in the video files 402a-402n. The frame ID 490b may identify the particular video frames that the smart metadata corresponds to. In the example shown, the frame ID 490b may be 105-110. The frame ID 490b may correspond to the frame ID 422 in the video files 402a-402n. The timestamp 490c may identify the time that the video frame 452 was captured. In the example shown, the timestamp 490c may be 1 AM-1:05 AM. The timestamp 490c may correspond to the frame ID 422 and/or the frame timestamp 412 in the video files 402a-402n. The vehicle ID 490d may identify the particular ego vehicle implementing the camera systems 100a-100n used to capture the video frame 452. In the example shown, the vehicle ID 490d may be A1 (e.g., an identifier for the vehicle fleet 50a-50n). The vehicle ID 490d may correspond to the vehicle ID 428 in the video files 402a-402n. The description 490e may comprise the natural text description of the video content of the video frame 452. In the example shown, the description 490e may be "driver wearing hat, eyes on road, seatbelt on, one hand on wheel". The description 490e may correspond to the natural text description 454 in the video files 402a-402n. Other data may be captured as part of the smart metadata entry 454 (e.g., the driver ID, a driver score, an event description, etc.). The number, type and/or information stored as the smart metadata may be varied according to the design criteria of a particular implementation. Details of the smart metadata may be described in association with U.S. patent application Ser. No. 18/210,931, filed on Jun. 16, 2023, appropriate portions of which are incorporated by reference.

The description 490e may be generated in response to the video-to-text analysis performed by the AI module 270. For example, the description 490e may describe the video contents with sufficient detail that the source video frame 452 may no longer be necessary to understand the video contents. For example, the description 490e may provide a human readable description of the contents of the video frame 452 with sufficient detail to enable the visually impaired to understand the contents of the video frames (e.g., using a screen reader). The description 490e may further comprise content acquired from the sensors 164 and/or the CAN bus of the vehicle 50. For example, the description 490e may describe the driver 60 (e.g., what the driver is wearing, where the driver is looking, what the driver is doing with his hands, whether the driver is wearing a seatbelt, how long the driver has been driving, etc.) and provide additional details received from thermal data (e.g., the temperature in the cabin interior 466, a temperature in a cargo hold, information from a telematics system, etc.) and/or data received from the CAN bus (e.g., a current speed of the vehicle 50, a rate of acceleration of the vehicle 50, a battery charge remaining, etc.).

The driving rule AI model 274 may analyze the video contents (e.g., using video analysis and/or by analyzing the description 490e). In the example shown, the driving rule AI model 274 may detect that the driver 60 is attentive to the road (e.g., not distracted). For example, no triggers may be detected. With no triggers detected, the driver scores 286 may not be updated. In some embodiments, good habits may be used to update the driver scores 286. For example, wearing sunglasses in a sunny environment may be a trigger that provides an increase to the driver score. In another example, driving below the speed limit, an appropriate amount of time driving between breaks, wearing a seatbelt, etc. may be used to increase the driver scores 286 (e.g., good behavior may be rewarded). In the example shown, the driver 60 may be holding the steering wheel with one hand. One handed steering may be a trigger that may deduct from the driver scores 286 (e.g., a bad behavior may result in a lower score). Detecting a one handed steering event trigger may not be sufficient to generate a notification (e.g., a minor infraction may be detected as the trigger). For example, a minor infraction may be a trigger that may indicate how a driver may improve at driving, but may not be considered sufficient to involve immediate intervention.

Figure 9:
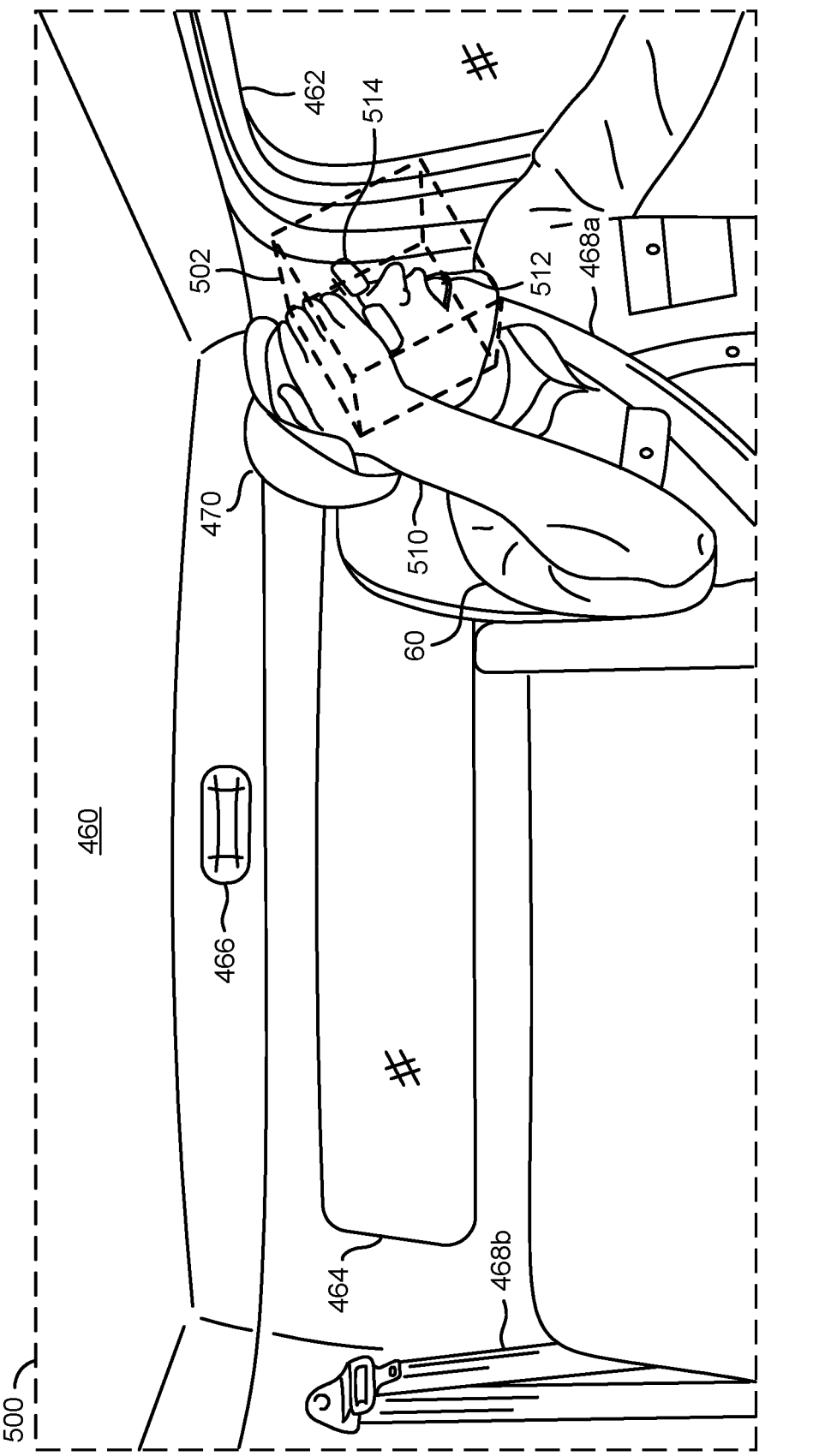
FIG. 9 is a diagram illustrating an analysis of a video frame with a distracted driver.

Referring to FIG. 9, a diagram illustrating an analysis of a video frame with a distracted driver is shown. An example video frame 500 is shown. The example video frame 500 may be a video frame captured subsequent to the example video frame 452 shown in association with FIG. 8. For example, the video frame 500 may comprise an example of the field of view 62e captured by the camera system 100e shown in association with FIG. 1. Similar to the video frame 452, the AI module 270 may perform the video to text analysis to generate the natural text description 424 to store in the text metadata 282. The driving score AI module 274 may analyze the video frame 500 (e.g., using computer vision operations and/or analyzing the natural text description 454) to detect the triggers and/or adjust the driver scores 286.

The example video frame 500 may comprise the driver 60, the interior cabin 460, the driver side window 462, the rear window 464, the cabin light 466, the seatbelts 468a-468b, and the hat 470. The example video frame 500 may further comprise a trigger detection 502. The trigger detection 502 may be determined by the driving score AI module 274 in response to an object detection, a behavior of the driver 60 and/or a combination of behaviors. A hand placement 510, an open mouth 512 and/or a gaze direction 514 are shown. The hand placement 510 is shown on the face of the driver 60, which may indicate distress and/or exhaustion. The open mouth 512 may be determined to be a yawn, which may indicate exhaustion. The gaze direction 514 is shown towards the driver side window 462, which may indicate distraction.

The natural text description 424 of the example video frame 500 be stored in the text metadata 282. For the example video frame 500, a portion of the natural text description 424 may comprise "The driver has one hand on the steering wheel. The driver is looking out of the driver side window instead of through the windshield. The driver may be distracted. The mouth of the driver is opened, as part of a yawn. The driver has taken his hand off the steering wheel and is rubbing his forehead. The driver appears exhausted. The driver has been driving for three hours without a break". The natural text description 424 may be longer and/or more detailed than the example provided. For example, additional details may be recorded (e.g., the empty passenger seat, whether the seatbelt is worn, the status of the cabin light, what is visible through the rear window, the colors of various objects, the distances of various objects from each other, etc.). Further details may be generated using the inferences from the sensor fusion module 190c, sensor data generated by the sensors 164, and/or data available on the CAN bus of the vehicle 50 (e.g., speed, direction, impact detections, etc.). The amount of detail generated for the natural text description 424 may be varied according to the design criteria of a particular implementation.

The driving score AI module 274 may compare the natural text description 424 and/or other content in the text metadata 282 with the event triggers 284. The driving score AI module 274 may search the text metadata 282 for the triggers. In response to detecting one or more of the triggers, the driving score AI module 274 may adjust the driver scores 286 and/or generate a notification. For video data of the interior cabin 460 of the vehicle 50, the triggers may comprise indications of driver drowsiness (e.g., yawning, blink rate, eyes closed, head bobbing, etc.), driver distraction (e.g., talking, looking at smartphone and/or other electronic devices, talking on a radio, not looking at the road, etc.), driving habits that may not be recommended (e.g., one hand on the steering wheel, hands not placed at 10 and 2 on the wheel, eating while driving, etc.), not following safety procedures and/or laws (e.g., not wearing seatbelt, texting while driving, allowing a child on lap, etc.), etc. In some embodiments (e.g., for commercial vehicles), the triggers may comprise detecting potential issues with cargo (e.g., cargo not properly strapped down, cargo falling over, fragile cargo not stored properly, etc.). The event triggers 284 may comprise a list of triggers such as "trigger when the driver is looking at a cell phone for more than 5 seconds" (e.g., the time limit may be implemented to prevent false positive detections). The types of triggers implemented for the interior of the vehicle 50 may be varied according to the design criteria of a particular implementation.

In some embodiments, the sensor fusion module 190c may be configured to combine data from the sensors 164 with the detections in the video frame 500. For example, the thermal camera 188n may be used to determine an interior of the vehicle 50 and/or the temperature of cargo carried by the vehicle 50. For example, the trigger may correspond to a storage temperature of perishable goods (e.g., frozen foods). The sensor fusion module 190c may be configured to analyze each of the sensor types 188a-188n and the results of the computer vision operations to make inferences using multiple, disparate data sources. The inferences may be stored in the text metadata 282. For example, the inferences from the sensor fusion module 190c may be provided as input to the text to video AI module 272. The natural text description 424 may comprise details from the inferences from the sensor fusion module 190c. For example, a natural text description that comprises inferences from the thermal camera 188n for cargo of a commercial vehicle may comprise, "Boxes of frozen goods are stacked on top of each other. The box on the bottom has a label of 'this end up arrow' pointing downwards. The temperature is 3 degrees Celsius. There are condensation droplets on the boxes. The condensation and the above freezing temperature indicates that the frozen goods are beginning to thaw". The type of inferences made using the sensor fusion module 190c and/or the natural text description generated when sensor data is combined with the video detection results may be varied according to the design criteria of a particular implementation.

The driving score AI module 274 may be configured to enable real time feedback for driving improvement. Detecting the triggers may be used to update the driver scores 286 and/or generate notifications. Using the driver scores 286 and/or notifications, smarter driver monitoring with real time feedback for driving improvement and driver scoring may be implemented. In the example shown, if one of the triggers comprises a detection of distracted driving and/or driver drowsiness, the comparison with the natural text description 424 may match with driver drowsiness. In response to the detection of the trigger, the driving score AI module 274 may update the driver scores 286. The driver scores 286 may comprise data indicating how the particular trigger detected may impact the adjustment to the driver score. For example, detecting a yawn may indicate drowsiness, but may not result in a deduction. In another example, the detection of the yawn followed by the eyes of the driver closing may result in a larger deduction. In some embodiments, particular drivers may affect the driving score adjustment. For example, a driver that has multiple instances of the same trigger (e.g., multiple infractions) may receive larger deductions. For example, the trigger for a driver checking the smartphone may have a small deduction for a first infraction, but a driver that repeatedly triggers checking the smartphone may receive incrementally larger deductions for repeat infractions. The particular adjustment to the driver scores 286 may be varied according to the design criteria of a particular implementation.

In some embodiments, a notification may be generated. For example, a notification may be generated to warn the driver and/or provide real time feedback. Generally, notifications may be generated to warn the driver about potentially unsafe behavior. For example, in response to detecting a yawn, a notification may be generated to remind the driver 60 to consider taking a break (e.g., a gentle suggestion). In another example, in response to detecting that the driver has fallen asleep, a notification may be generated to attempt to awaken the driver 60. Some triggers may not result in a notification. The particular triggers that result in a notification and/or the type of notification generated for each trigger may be varied according to the design criteria of a particular implementation.

In response to detecting the trigger, the driving score AI module 274 may generate the signal SCORE. In some embodiments, the signal SCORE may be presented to the memory 150 (e.g., to update the driver scores 286) and/or the communication interface 254. For example, in response to detecting the drowsy state of the driver 60, the signal SCORE may be communicated to the remote computing service 352 to enable the fleet manager to search for drivers that are sleepy. When the driving score analysis is performed, the smart metadata entries may be analyzed by the driving score AI module 274 to determine if the text description corresponds to the criteria of the triggers. When the trigger is determined to have been met, then the driving score AI module 274 may generate the signal SCORE to enable the signal NOTIFY to be presented to the user device 252.

Figure 10:
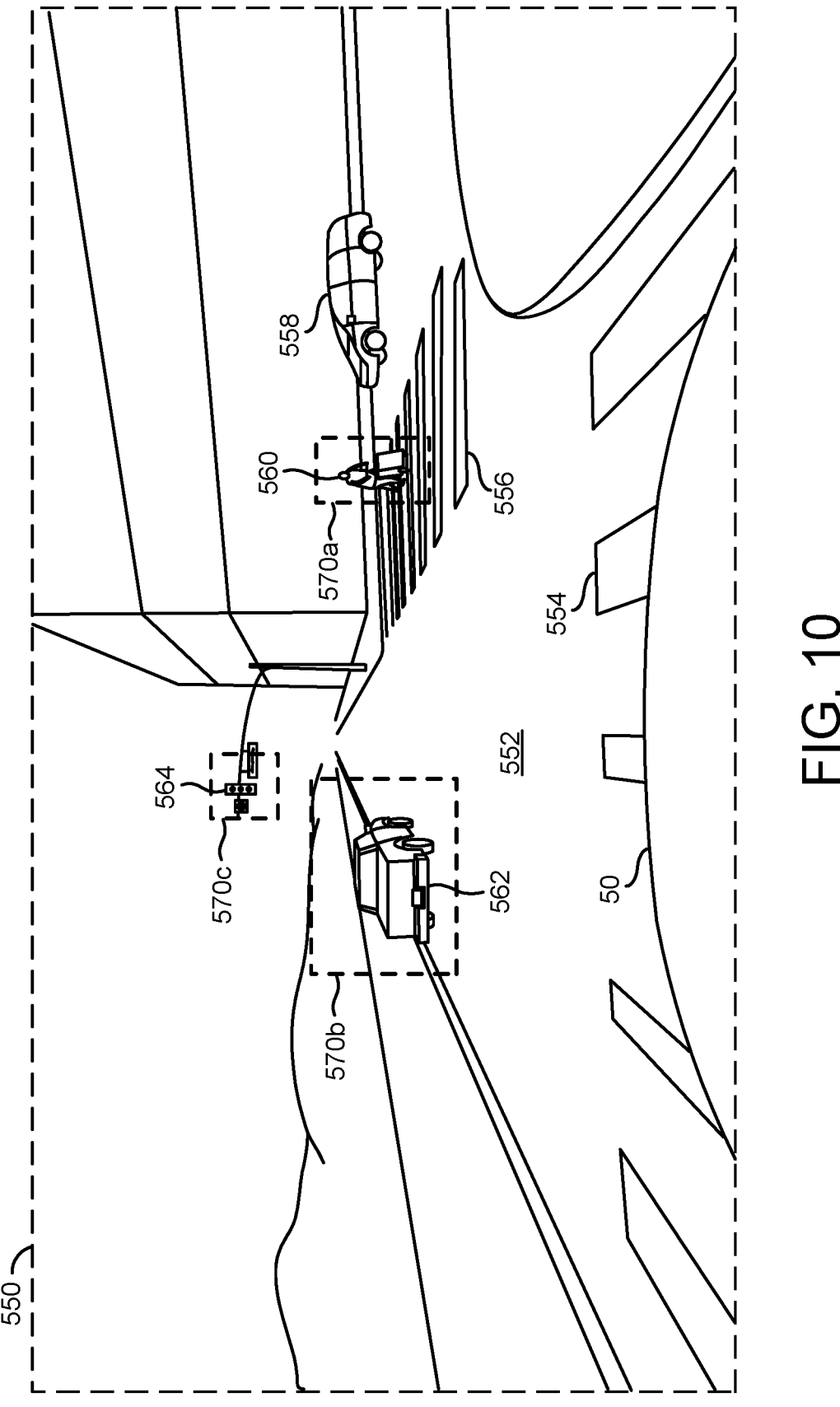
FIG. 10 is a diagram illustrating an analysis of a video frame to generate smart metadata of an environment near a vehicle.

Referring to FIG. 10, a diagram illustrating an analysis of a video frame to generate smart metadata of an environment near a vehicle is shown. An example video frame 550 is shown. The example video frame 550 may correspond to part of the all around view 62a-62d of the vehicle 50 generated by the camera systems 100a-100d as shown in association with FIG. 1. Video frames of the exterior of the vehicle 50 may undergo a similar analysis (e.g., video to text analysis and/or driving score analysis) of the video frames of the vehicle interior as described in association with FIGS. 8-9.

The video frame 550 may comprise the vehicle 50 (e.g., a hood is shown indicating a front view), an intersection 552, crosswalks 554-556, a vehicle 558, a pedestrian 560, a vehicle 562 and/or a street light 564. The processor 102 may perform computer vision operations on the video frame 550 to detect objects and/or determine the natural text description 424. In the example shown, detected objects 570a-570c are shown. The detected object 570a may be the pedestrian 560, the detected object 570b may be the vehicle 570b and the detected object 570c may be the vehicle 570c. The computer vision operations may be configured to determine a status of objects (e.g., the street light 564 may be a red light, the vehicle 558 may be stopped) and/or a relationship between objects detected (e.g., the pedestrian 570 is walking on the crosswalk 556, the vehicle 562 is driving in the same direction as the vehicle 50, etc.).

The video to text AI module 272 may generate the natural text description of the video frame 550. For a condensed example, the natural text description 424 may comprise text of "the ego vehicle is stopped before a crosswalk at an intersection. A red light is facing the driver at the intersection. A truck in the same lane is driving through the intersection. A minivan is waiting to the right at another crosswalk. A pedestrian pushing a cart is walking on the crosswalk in front of the minivan". The driving score AI module 274 may analyze the natural text description 424 to determine whether any of the event triggers 284 have are present in the video frame 550 (and/or a sequence of video frames).

For the text metadata 282 that corresponds to video data captured of the exterior of the vehicle 50, the triggers may correspond to an analysis of driving behavior and/or how the vehicle 50 is following the rules of the road. For example, the triggers may comprise sudden acceleration, lane cutting, driving too close to car in front, braking, lane changing without indicator, stop sign violations, stop light violations, yellow light (cruising), speeding, etc., For example, sudden acceleration (and similarly braking) may be detected by analyzing a sequence of video frames (e.g., the video frame 550 with the vehicle 50 stopped and subsequent frames to determine how quickly the vehicle 50 moves from the stopped position) and/or using the sensor fusion module 190c (e.g., based on receiving speed data over the CAN bus of the vehicle 50). Lane cutting may be determined by detecting the road lines and/or determining how close the vehicle 50 is to other vehicles when changing lanes. Driving too close may comprise measuring distances to other vehicles (e.g., using monocular distance estimation based on the structured light projector 106 and/or using stereo cameras for distance estimation). Lane changing without indicator may comprise a combination of video analysis (detecting a lane change) and information from the CAN bus (e.g., whether the appropriate indicator was activated). Stop light and yellow light violations may be determined by analyzing the status of the stop light 564. The particular triggers and/or the methods of determining whether the triggers have been detected may be varied according to the design criteria of a particular implementation.

In some embodiments, inferences may be determined by combining information from video frames captured of the interior cabin 460 and video data of the exterior of the vehicle 50. For example, if the video frame 500 is captured at the same time as the video frame 550, the driver 60 may be distracted and/or looking out the driver side window 462. The pedestrian 560 may be on a passenger side of the vehicle 50. Since the driver 60 is looking away from the passenger side, an inference may be made that the driver 60 cannot see the pedestrian 560. A notification may be generated to warn the driver 60 about the pedestrian.

In some embodiments, a particular scenario may determine the adjustment to the driver score. For example, the driver 60 looking out the driver side window 462 may be a trigger, but further analysis may not result in a deduction to the driving score if it is later determined that the driver 60 is attempting to change lanes (e.g., the driver should be looking out of the window). In another example, the deduction may be increased when the driver 60 is in a more complicated scenario, such as waiting at the intersection 552 (e.g., the driver should be paying attention to traffic).

Figure 11:
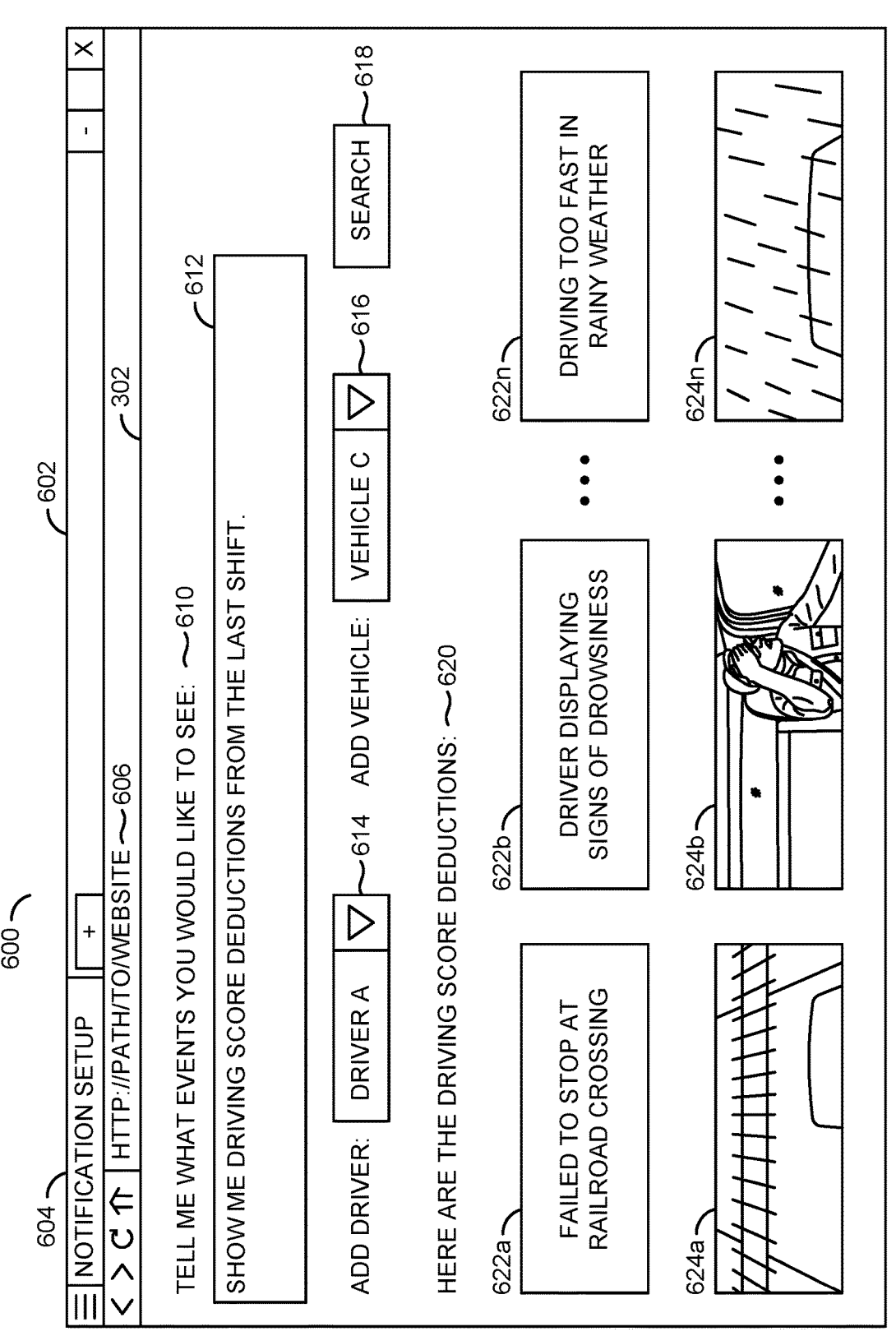
FIG. 11 is a diagram illustrating an interface for real-time driver feedback.

Referring to FIG. 11, a diagram illustrating an interface for real-time driver feedback is shown. An interface 600 is shown. In some embodiments, the interface 600 may be a GUI of the user interface 302 implemented by a companion app for the edge devices 100a-100n installed on the user device 252. In the example shown, the interface 600 may be a web-based implementation of the user interface 302 viewable using the user device 252. The interface 600 may be generated in response to the UI data 288. The interface 600 may comprise a browser window 602, a browser tab 604, a URL link 606 and the user interface 302. For example, the end user may load the browser tab 604 to the URL link 606 associated with the edge devices 100a-100n and/or the scalable computing service 352 to load the user interface 302.

The user interface 302 may comprise a prompt 610, an input box 612, a dropdown input selection 614, a dropdown input selection 616, a button 618, a heading 620, textboxes 622a-622n and/or a search result thumbnails 624a-624n. The prompt 610 may implement an input prompt. The input box 612 may implement a natural language query input. The dropdown input selection 614 may implement an input for adding people and/or items to the query. The dropdown input selection 616 may implement an input for adding vehicles to the query. The button 618 may implement a search button. The heading 620 may implement a search result heading. The textboxes 622a-622n may implement driving score search results. The search result thumbnails 624a-624n may implement a search result video indicators.

The prompt 610 may indicate that the end user may enter the query text in the natural language query 612. The end user may provide a natural text description of a query for the driver scores. In another example, the end user may provide a natural text description of a new trigger (as described in association with FIG. 6). The dropdown input selection 614 may enable the end user to select from a pre-populated list of known drivers. For example, the memory 150, the smart metadata 282 and/or the driver scores 286 may store reference images and/or feature sets for facial recognition that may be associated with a name of the driver 60 detected that may be used to determine the driver ID 430. In one example, the reference images may be extracted from a contact photo on the user device 252 (e.g., a photo captured by a camera of a smartphone) and/or an employee ID photo. For example, the dropdown input selection 614 may comprise an entry for "Alice" and "Bob" to enable the driver score query to apply to particular drivers. The dropdown input selection 616 may enable the end user to select from a pre-populated list of the fleet of vehicles 50a-50n. For example, the memory 150, smart metadata 282 and/or the driver scores 286 may store the vehicle ID 428. For example, the dropdown input selection 616 may comprise entries for the fleet of vehicles 50a-50n (e.g., a VIN number, a license plate number, a user-defined identity, etc.).

Using the dropdown input selection 614 and/or the dropdown input selection 616, the driver score query may be limited to a particular driver and/or a particular vehicle. In some embodiments, the driver score query may be limited to both a particular driver and a particular vehicle. In some embodiments, the driver score query may not be limited to any particular driver or vehicle (e.g., a system-wide query). The end user may submit the driver score query 612 using the search button 618.

The natural language input 612 may comprise a natural language text description of the query that may be combined with the driver limitation from the dropdown input selection 614 and/or the vehicle limitation form the dropdown input selection 616. In the example shown, the natural language input 612 may be plain language input by the end user. The input prompt 610 may provide context for submitting the query. In the example shown, the input prompt 610 may state "Tell me what events you would like to see", indicating that the end user may provide natural language descriptions and/or requests, as if speaking to a person. In the example shown, the natural language input 612 may be the query "Show me driving score deductions form the last shift". The input prompt 610 and the natural language input 612 (and the driver limitation and the vehicle limitation) may provide context to enable the LLM AI module 310 to generate accurate and/or relevant search results. The type of language input and/or the particular driver and/or vehicle information to create a query (e.g., a person, a vehicle, a type of event, an amount of driver score adjustment, a time range, a location limitation, etc.) may be varied according to the design criteria of a particular implementation.

In response to the end user interacting with the search button 618, the query may be sent to the LLM AI module 310 via the signal QUERY. The LLM AI module 310 may parse the query in response to the notification rule input 612 and/or pre-identified drivers/vehicles from the dropdown input selections 614-616. The query module 304 comprising the LLM AI module 310 and/or the search module 312 may be configured to parse the natural language input 612 and determine whether a query has been provided or a new trigger. The signal SEARCH may be generated comprising the query.

The search result heading 620 may indicate for the end user the search results being provided. The search result heading 620 may reflect the query (e.g., to provide a conversational interface). In the example shown, the search result heading 620 may be "Here are the driving score deductions".

The driving score search results 622a-622n may comprise the results that correspond to the query provided. In an example, data from the driver scores 286 may be communicated with the signal UI to generate the user interface 302. Example search results 622a-622n are shown. For example, based on the criteria in the query (e.g., driving score deductions during a particular time range), the search results 622a-622n may comprise a text description of the type of driver score deduction found. In the example shown, the search result 622a may be "Failed to stop at railroad crossing", the search result 622b may be "Driver displaying signs of drowsiness" and the search result 622n may be "Driving too fast in rainy weather". The response to the query provided may further comprise the associated video results. The search result thumbnails 624a-624n may provide an indication of the associated video results. In one example, the end-user may interact with the search result thumbnails 624a-624n to stream and/or download the associated video results. The search result thumbnails 624a-624n may correspond to the search results 622a-622n. In the example shown, the search result thumbnail 624a may comprise the video data 280 that corresponds to the driving score deduction of failing to stop at a railroad crossing, the search result thumbnail 624b may comprise the video data 280 that corresponds to the driving score deduction of the driver 60 displaying signs of drowsiness and the search result thumbnail 624n may comprise the video data 280 that corresponds to the driving score deduction of driving too fast in the rainy weather. The number of search results 622a-622n shown and/or the availability of the associated videos may depend on the input provided by the end user.

The signal SRES may comprise the text description of the search results 622a-622n. The LLM AI module 310 may be configured to generate a natural language answer for the search results 622a-622n. The query module 304 may generate the signal ANS comprising the description of the search results 622a-622n. The signal ANS may be displayed as the search results 622a-622n on the user interface 302. Similarly, the signal VDATA may comprise the video data 280 for the search results. The video transcode module 306 may generate the video results in a format compatible with the user device 252. In the example shown, the signal VIDOUT may be generated in response to a user interacting (e.g., clicking, tapping, etc.) the search result thumbnails 624a-624n. In some embodiments, along with the text description for the search results 622a-622n in the signal ANS, the associated video data 280 may be presented as the signal VIDOUT. For example, frame number ID 422 and/or the timestamps 412 comprising the detection associated with the results of the query may be transcoded using the video transcode module 306 and communicated in the signal VIDOUT along with the signal ANS in the signal NOTIFY sent to the user device 252.

In some embodiments, the driving score search results 622a-622n may provide recommendations to improve driving habits. In one example, the natural language input 612 may comprise the query, "How can I improve my driving". The driver scores 286 may be searched to determine the adjustments to the driver score for the particular driver. The signal SRES may provide the deductions performed in response to the triggers and the LLM AI module 310 may generate the signal ANS to provide the search results 622a-622n with the suggestion for improvements as well as reasons why the recommendations improve driving behavior. For example, the search results 622a-622n may provide a natural language description of, "You have a tendency to brake too harshly. Braking too harshly means you have less time to come to a complete stop and you may not stop in time to avoid hitting an object. Harsh braking also results in additional wear on your brake pads, which will cost you money in repairs. I have annotated a video of a situation where you braked harshly with an indication of when you should have started applying the brakes". For example, the video transcode module 306 may apply annotations to the video data 280 to provide additional instructions.

Referring to FIG. 12, a method (or process) 650 is shown. The method 650 may implement driver monitoring with real-time feedback. The method 650 generally comprises a step (or state) 652, a step (or state) 654, a step (or state) 656, a step (or state) 658, a step (or state) 660, a step (or state) 662, a step (or state) 664, a decision step (or state) 666, and a step (or state) 668.

The step 652 may start the method 650. Next, the method 650 may move to the steps 654-656. For example, the steps 654-656 may be performed in parallel and/or substantially in parallel. In the step 654, the processor 102 may receive the pixel data of the cabin interior 460 of the driver 60. Next, the method 650 may move to the step 658. In the step 656, the processor 102 may receive the pixel data of the environment 40 near the vehicle 50. Next, the method 650 may move to the step 658. In an example, the capture device 104 may generate the pixel data in response to the light input signal LIN and generate the signal VIDEO comprising the pixel data. Next, in the step 658, the processor 102 may perform video processing operations using the video processing pipeline 260 to process the pixel data arranged as video frames (e.g., the video frame 452 and/or the video frame 550). For example, the CNN module 190b and/or the AI module 270 may perform computer vision operations on the video frames to detect objects. Next, the method 650 may move to the step 660.

In the step 660, the AI module 270 may perform the video-to-text analysis to describe the video contents, visual information and/or the context of the video frame(s) being analyzed. Each of the video frames may be individually analyzed and/or analyzed together by the AI module 270 in order to generate a human readable description of the human viewable information in the signal VDATA. Next, in the step 662, the text description generated may be stored with a timestamp as the smart metadata. For example, detected objects and/or behavior of vehicles, pedestrians, the driver 60, etc. from the step 660 may have the natural text description stored in the text metadata 282 in response to the video to text analysis. The natural text description 424 associated with the video frame 410, frame ID 422 associated with the frame timestamp 412 and/or additional data may be stored in the text metadata 282. In the step 664, the processor 102 may compare the event triggers 284 with the natural text description 424 of the video frames 410. For example, the event triggers 284 may comprise a natural text description of the triggers. The LLM AI module 310 may determine the criteria the event triggers 284. Next, the method 650 may move to the decision step 666.

In the decision step 666, the processor 102 may determine whether the trigger has been detected. In some embodiments, the CNN module 190b implemented by the processor 102 may perform computer vision operations on the incoming input video frames to search for the criteria of the event triggers 284. For example, the event triggers 284 may comprise a feature set for performing computer vision operations. In some embodiments, the driving score AI model 274 may compare the natural text description 424 of the smart metadata 282 for the video frames 410 to the text description of the event triggers 284. If the trigger has not been detected, then the method 650 may return to the steps 654-656. If the trigger has been detected, then the method 650 may move to the step 668. In the step 668, the processor 102 may adjust the driver scores 286. In an example, the driver scores 286 and/or the event triggers 284 may comprise an amount of adjustment to the driver scores 286 based on the particular trigger detected. Next, the method 650 may return to the steps 654-656. For example, the AI module 270 may constantly generate plain test description of what is in the video frames so that later questions may be asked based on an analysis of the text description.

Referring to FIG. 13, a method (or process) 700 is shown. The method 700 may adjust a driver score based on inferences from sensor fusion. The method 700 generally comprises a step (or state) 702, a step (or state) 704, a step (or state) 706, a step (or state) 708, a step (or state) 710, a step (or state) 712, a step (or state) 714, a step (or state) 716, a decision step (or state) 718, and a step (or state) 720.

The step 702 may start the method 700. In the step 704, the processor 102 may receive and/or generate the video frames. Next, in the step 706, the processor 102 may read data from the CAN bus of the vehicle 50. For example, the CAN bus provide the signal SENS to the processor 102 comprising information about the vehicle 50 (e.g., a current speed, an amount of acceleration, data from impact sensors, the activation/deactivation of turn signals, etc.). In the step 708, the processor 102 may receive sensor data. The sensors 164 may provide the signal SENS to the processor 102. For example, the lidar 188a may generate a point cloud, the radar 188b may provide high resolution radar data, the thermal camera 188n may provide a thermal image, a gyroscope may provide acceleration data, etc. Next, the method 700 may move to the step 710.

In the step 710, the sensor fusion module 190c may analyze the combination of video data, data from the CAN bus and/or the sensor data to determine various inferences from the multiple data sources. Next, in the step 712, the sensor fusion module 190c may generate data timestamps for the inferences. For example, the sensor fusion module 190c may ensure that the multiple data sources captured at the same time are compared to determine the inferences. In the step 714, the sensor fusion module 190c may present the inferences to the video-to-text AI module 272 to enable a generation of a text description of the environment and/or driving scenario in response to the inferences. For example, the inferences may provide an additional source of data to expand on the understanding of the environment 40 and/or the driving scenario to generate the natural text description 424. In some embodiments, the text description of the inferences may be combined with the natural text description of the video frames and stored as the natural text description 424. In some embodiments, the natural text description of the inferences may be stored separately from the natural text description of the video frames. For example, the natural text description 424 may comprise the video-to-text description and the event description 426 may comprise the inferences from the sensor fusion analysis. The data timestamps for the inferences may be stored as the frame ID 422 (e.g., the sensor data and the video frame text descriptions may be associated with the time of capture of the video frames). In the step 716, the driving score AI module 274 may compare the text description from the inferences to the event triggers 284. Next, the method 700 may move to the decision step 718.

In the decision step 718, the driving score AI module 274 may determine whether the trigger has been detected. For example, the text description of the inferences may be compared with the text description of the event triggers 284. If the trigger has not been detected, then the method 700 may return to the step 704. If the trigger has been detected, then the method 700 may move to the step 720. In the step 720, the processor 102 may adjust the driver scores 286 based on the trigger(s) detected. Next, the method 700 may return to the step 704.

Figure 14:
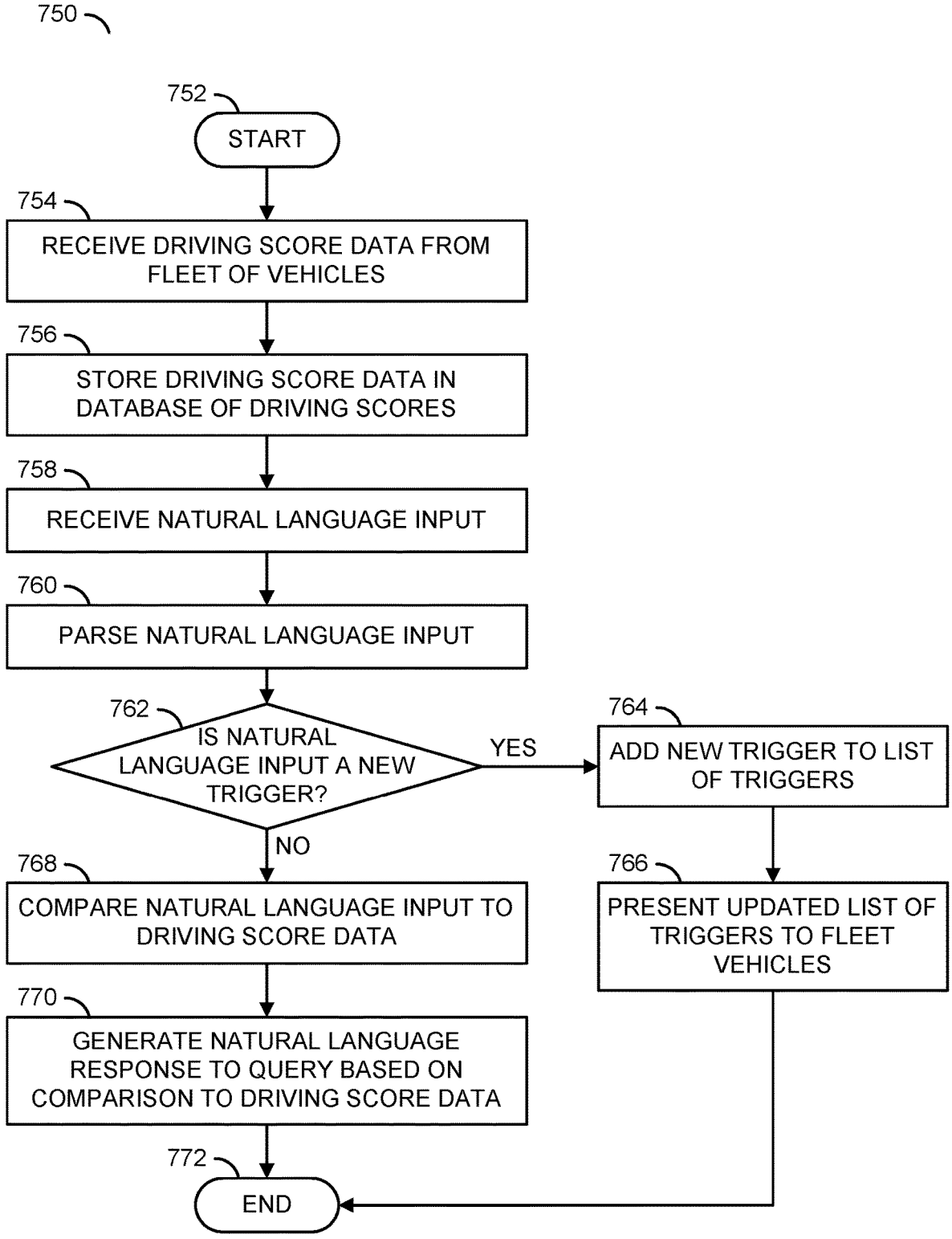
FIG. 14 is a flow diagram illustrating a method for generating a response to a natural language user input.

Referring to FIG. 14, a method (or process) 750 is shown. The method 750 may generate a response to a natural language user input. The method 750 generally comprises a step (or state) 752, a step (or state) 754, a step (or state) 756, a step (or state) 758, a step (or state) 760, a decision step (or state) 762, a step (or state) 764, a step (or state) 766, a step (or state) 768, a step (or state) 770, and a step (or state) 772.

The step 752 may start the method 750. In the step 754, the remote computing device 352 may receive the driving score data from the fleet of vehicles 50a-50n. For example, the communication interface 254 implemented in each of the vehicles 50a-50n may communicate the respective signals SCORE_A-SCORE_N to the driving score database 360. Next, in the step 756, the driving scores may be stored as the driving score data 370a-370n in the driving score database 360. In the step 758, the LLM AI module 310 implemented in the remote computing device 352 may receive the signal FLTQUERY/FLTTRIG comprising natural language input from the user device 252. Next, in the step 760, the LLM AI module 310 may parse the natural language input. Next, the method 750 may move to the decision step 762.

In the decision step 762, the LLM AI module 310 may determine whether the natural language input is a new trigger. If the natural language input is a new trigger, then the method 750 may move to the step 764. In the step 764, the LLM AI module 310 may add the new trigger to the list of triggers. Next, in the step 766, the updated list of triggers may be presented to the fleet of vehicles 50a-50n (e.g., to provide the updated list of triggers for the event triggers 284). Next, the method 750 may move to the step 772.

In the decision step 762, if the natural language input is not a new trigger (e.g., a query is detected), then the method 750 may move to the step 768. In the step 768, the LLM AI module 310 may compare the natural language input of the query to the driving score data 370a-370n. Next, in the step 770, the LLM AI module 310 may generate the natural language response to the query based on the results of the comparison to the driving score data 370a-370n. For example, the LLM AI module 310 may communicate the signal FLTRESULT to the user device 252. Next, the method 750 may move to the step 772. The step 772 may end the method 750.

Figure 15:
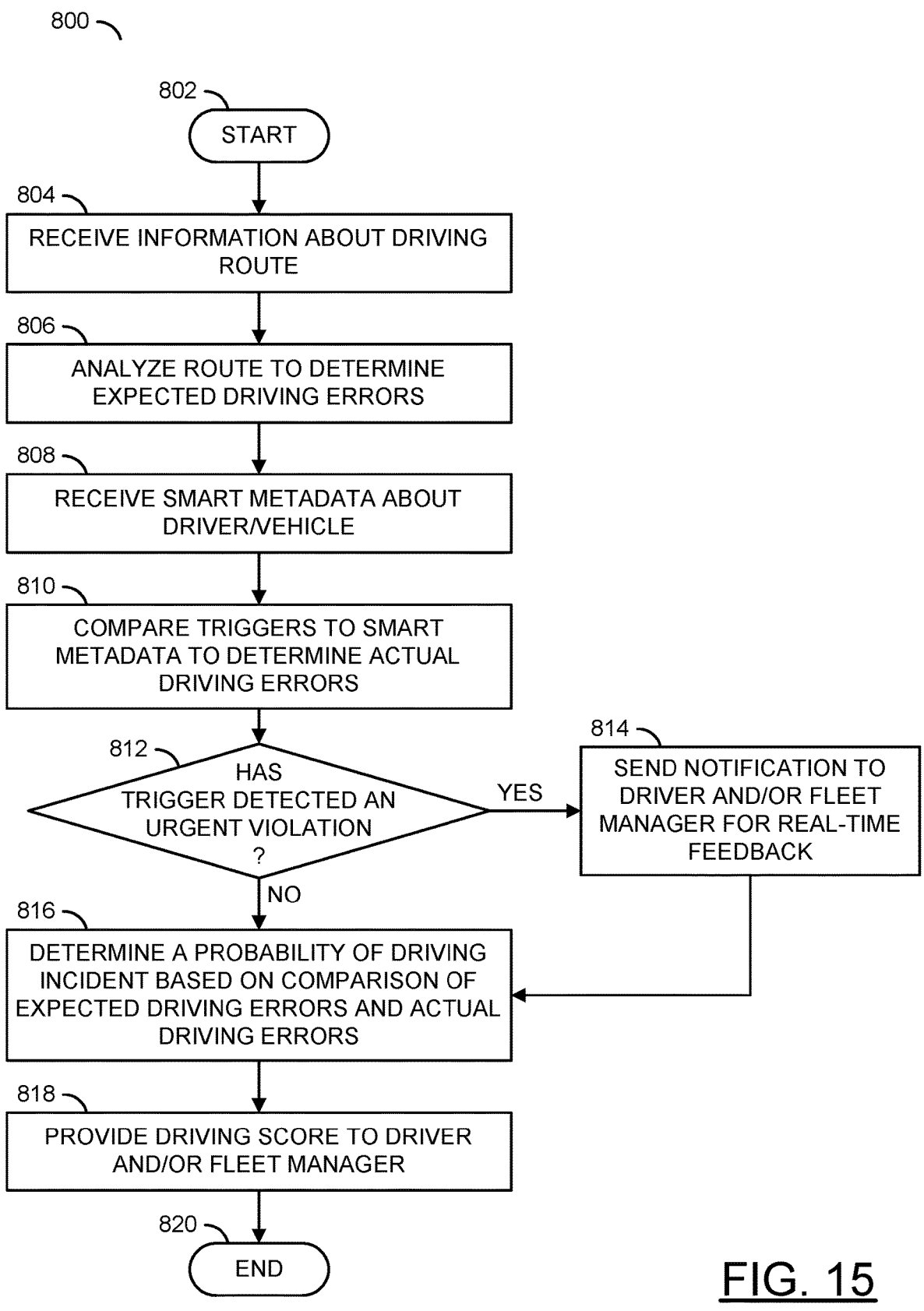
FIG. 15 is a flow diagram illustrating a method for determining a driving score.

Referring to FIG. 15, a method (or process) 800 is shown. The method 800 may determine a driving score. The method 800 generally comprises a step (or state) 802, a step (or state) 804, a step (or state) 806, a step (or state) 808, a step (or state) 810, a decision step (or state) 812, a step (or state) 814, a step (or state) 816, a step (or state) 818, and a step (or state) 820.

The step 802 may start the method 800. In the step 804, the driving score AI module 274 may receive information about the driving route. In an example, information about the driving route may comprise GPS/GNSS data, estimated driving time, estimated distance, road conditions, traffic conditions, weather conditions, video of previous traversal of the driving route, etc. Next, in the step 806, the driving score AI module 274 may analyze the driving route to determine the expected driving errors. The expected driving errors may comprise a number of triggers that a reasonable driver may perform for the driving route. For example, perfection may not be expected from a driver. The expected driving errors may comprises a tolerance for occasional speeding and/or minor errors that a driver may make when traveling the driving route based on the analysis of the driving route. The expected riving errors may be adjusted for driving conditions (e.g., driving during poor weather conditions compared to good driving weather conditions, driving during high traffic conditions compared to driving during low traffic conditions, etc.). Next, the method 800 may move to the step 808.

In the step 808, the driving score AI module 274 may receive the smart metadata 282 about the driver 60 and/or the vehicle 50. The smart metadata 282 may comprise the natural text description 424 of the cabin interior 460 and/or the natural text description 424 of the environment 40. The smart metadata 282 may further comprise the natural text description 424 of the inferences from the sensor fusion analysis. Next, in the step 810, the driving score AI module 274 may compare the event triggers 284 to the smart metadata 282 to determine any actual driving errors. For example, the actual driving error may comprise events such as speeding, failing to stop at a stop sign, tailgating, etc. detected in response to the analysis of the natural text description 424 of the video frames. Next, the method 800 may move to the decision step 812.

In the decision step 812, the driving score AI module 274 may determine whether the trigger detected comprises an urgent violation. For example, some of the event trigger 284 may be labeled as an urgent violation (or a high priority violation). In an example, high priority violations may comprise collisions, running red lights, falling asleep, etc. The high priority violations may be event triggers that may be remedied by immediate action (e.g., attempt to wake the driver, warning the driver to slow down in dangerous weather, notify the driver 60 about dangerous temperatures in the cargo hold, etc.). If the trigger is an urgent violation, then the method 800 may move to the step 814. In the step 814, the LLM AI module 310 may generate the signal ANS comprising a notification to the driver and/or the fleet manager to provide real-time feedback. In some embodiments, the real-time feedback may comprise an audio alert in the vehicle 50 (e.g., to attempt to awaken the driver, to warn the driver of an imminent collision, etc.). Next, the method 800 may move to the step 816. In the decision step 812, if the trigger detected is not an urgent violation, then the method 800 may move to the step 816.

In the step 816, the driving score AI module 274 may determine the probability of a driving incident occurring based on a comparison of the expected driving errors and the actual driving errors. For example, a probability may be determined of how likely a particular driver is to get into a collision based on how many actual driving errors are performed. Next, in the step 818, the driving score AI module 274 may provide the driver score to the driver 60 and/or the fleet manager. In an example, the driver score may comprise the probability of an incident. Next, the method 800 may move to the step 820. The step 820 may end the method 800.

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data of (i) a driver of a vehicle and (ii) an environment near said vehicle; and
a processor configured to (i) process said pixel data arranged as video frames, (ii) generate a text description of said video frames, (iii) store said text description and a timestamp corresponding to said text description as metadata with said video frames, (iv) store a plurality of, (v) perform a comparison of said triggers to said text description of said video frames, and (vi) generate a driver score in response to said comparison of said triggers to said text description, wherein (i) a first AI model is configured to perform video to text analysis of said video frames to generate said text description of said driver and said environment, (ii) a second AI model is configured to (a) perform said comparison and (b) generate said driver score in response to said triggers, and (iii) said plurality of triggers comprise a plain text description of (a) driver behavior and (b) an operation of said vehicle in said environment.

2. The apparatus according to claim 1, further comprising a sensor fusion module, wherein (i) said sensor fusion module is configured to read data from (a) a CAN bus of said vehicle and (b) one or more vehicle sensors, (ii) said sensor fusion module is configured to (a) make inferences in response to said data and (b) generate a data timestamp associated with said inferences, (iii) said first AI model is configured to generate a second text description in response to said inferences, and (iv) said comparison by said second AI model is further configured to compare said second text description at said data timestamp and said text description of said video frames at said timestamp with said triggers.

3. The apparatus according to claim 2, wherein said vehicle sensors comprise one or more of a gyroscope, an accelerometer, a radar system, and a lidar system.

4. The apparatus according to claim 1, wherein said driver score is configured to provide real time feedback for driving improvement to said driver.

5. The apparatus according to claim 1, wherein said driver score further comprises a notification of a detection of one or more of said triggers.

6. The apparatus according to claim 5, wherein said notification is communicated to an owner of said vehicle.

7. The apparatus according to claim 6, wherein (i) said vehicle is one of a plurality of vehicles in a vehicle fleet and (ii) said owner of said vehicle fleet is a fleet manager.

8. The apparatus according to claim 1, further comprising a large language model (LLM) AI model configured to receive input from a user device, wherein (i) said input comprises a natural language query about said text description of said video frames and (ii) said LLM AI model is configured to parse said natural language query, compare said natural language query to said text description of said video frames and generate a natural language response to said natural language query.

9. The apparatus according to claim 8, wherein (i) said input further comprises an input trigger provided using natural language and (ii) said LLM AI model is configured to parse said input trigger and add said input trigger to said plurality of triggers.

10. The apparatus according to claim 1, wherein (i) said driver score is uploaded to a remote database, (ii) said remote database is configured to store a plurality of driver scores comprising said driver score from said apparatus and additional driver scores from a vehicle fleet, and (iii) a large language model (LLM) AI model is configured to (a) access said plurality of driver scores in said remote database, (b) receive a natural language query from a manager of said vehicle fleet, (c) compare said natural language query to said plurality of driver scores and (d) generate a natural language response to said natural language query.

11. The apparatus according to claim 10, wherein (i) said natural language query comprises an alert threshold, (ii) said driver scores are tracked for said alert threshold and (iii) said LLM AI model is configured to generate said natural language response comprising a notification about said alert threshold in response to monitoring said driver scores for said alert threshold.

12. The apparatus according to claim 11, wherein said alert threshold comprises at least one of (i) a particular amount for said driver score and (ii) a particular one of said triggers.

13. The apparatus according to claim 1, wherein said plurality of triggers correspond to characteristics about said driver of said vehicle.

14. The apparatus according to claim 13, wherein said characteristics about said driver of said vehicle comprise one or more of driver distraction and driver drowsiness.

15. The apparatus according to claim 1, wherein said plurality of triggers correspond to behavior of said driver of said vehicle.

16. The apparatus according to claim 15, wherein said behavior of said driver comprises one or more of rapid acceleration, lane cutting, tailgating, rapid braking, indicator use, speeding, and road rule violations.

17. The apparatus according to claim 1, wherein said plurality of triggers correspond to said environment of said vehicle.

18. The apparatus according to claim 17, wherein said environment of said vehicle comprises one or more of a cargo temperature, information from telematics, time of day, and weather.

19. The apparatus according to claim 1, wherein (i) said driver score comprises a total number of points, and (ii) an adjustment to said driver score comprises a pre-defined deduction of points corresponding to a particular one of said triggers detected from said total number of points.

20. The apparatus according to claim 1, wherein (i) said driver score comprises a probability of an incident, and (ii) said of said incident comprises (a) determining a total distance of a route, (b) determining an expected number of infractions of said triggers for said route based on said total distance and (c) comparing said expected number of infractions to a number of said triggers detected.

* * * * *